United States Patent
Wu et al.

(10) Patent No.: US 12,538,334 B2
(45) Date of Patent: Jan. 27, 2026

(54) ON DEMAND SIDELINK RETRANSMISSION FOR HIGHER BANDS

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/335,899

(22) Filed: Jun. 1, 2021

(65) Prior Publication Data

US 2022/0386140 A1 Dec. 1, 2022

(51) Int. Cl.
*H04W 72/40* (2023.01)
*H04L 1/1867* (2023.01)
*H04W 16/28* (2009.01)
*H04W 72/02* (2009.01)
*H04W 72/044* (2023.01)
*H04W 92/18* (2009.01)

(52) U.S. Cl.
CPC ........... *H04W 72/40* (2023.01); *H04L 1/1896* (2013.01); *H04W 16/28* (2013.01); *H04W 72/02* (2013.01); *H04W 72/046* (2013.01); *H04W 92/18* (2013.01)

(58) Field of Classification Search
CPC ... H04W 16/28; H04W 72/02; H04W 72/046; H04W 92/18; H04L 1/1896
See application file for complete search history.

(56) References Cited

U.S. PATENT DOCUMENTS

| | | | | |
|---|---|---|---|---|
| 8,982,803 | B1 * | 3/2015 | Zhang | H04L 1/0026 370/329 |
| 2017/0005756 | A1 | 1/2017 | Suda | |
| 2019/0097751 | A1 * | 3/2019 | Li | H04L 1/0004 |
| 2020/0260231 | A1 * | 8/2020 | Ganesan | H04B 7/0695 |
| 2020/0359366 | A1 * | 11/2020 | Kim | H04B 7/0695 |
| 2021/0028891 | A1 * | 1/2021 | Zhou | H04W 4/40 |
| 2021/0219268 | A1 * | 7/2021 | Li | H04W 72/20 |
| 2021/0336728 | A1 * | 10/2021 | Selvanesan | H04L 1/1896 |
| 2022/0061078 | A1 * | 2/2022 | Guan | H04L 1/1893 |
| 2023/0040934 | A1 * | 2/2023 | Qu | H04W 72/25 |
| 2023/0199681 | A1 * | 6/2023 | Hwang | H04W 48/10 |
| 2023/0276462 | A1 * | 8/2023 | Hwang | H04W 4/46 370/329 |

* cited by examiner

*Primary Examiner* — Siming Liu
(74) *Attorney, Agent, or Firm* — QUALCOMM Incorporated

(57) ABSTRACT

Methods, systems, and devices for wireless communications are described. A user equipment (UE) may transmit, in a plurality of directions using a plurality of transmit beams of the UE, a first set of sidelink messages to a plurality of UEs, each transmit beam of the plurality of transmit beams associated with a respective direction of the plurality of directions. The UE may receive, in one or more directions of the plurality of directions, a feedback message from one or more UEs that are a subset of the plurality of UEs, each feedback message indicating whether the sidelink message was received and decoded by a respective UE of the one or more UEs. The UE may transmit, based at least in part on the feedback message from the one or more UEs, a second set of sidelink messages in the one or more directions to the one or more UEs.

27 Claims, 12 Drawing Sheets

First Set of Sidelink Messages

Second Set of Sidelink Messages

First Set of Sidelink Messages

Second Set of Sidelink Messages

ON DEMAND SIDELINK RETRANSMISSION FOR HIGHER BANDS

FIELD OF TECHNOLOGY

The following relates to wireless communications, including on demand sidelink retransmission for higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support on demand sidelink retransmission for higher bands. Generally, the described techniques provide for more intelligent sidelink transmissions when the sidelink communications are in higher bands (e.g., 6+ GHz). For example, a sidelink user equipment (UE) may transmit a first set of sidelink messages (e.g., a set of one or more sidelink messages) in a plurality of directions using a corresponding plurality of transmit beams. The sidelink messages may be transmitted to a plurality of UEs (e.g., broadcast sidelink transmissions, groupcast sidelink transmissions). UE(s) receiving (or configured to receive) related sidelink transmissions (e.g., retransmissions of the sidelink message, transmissions of related sidelink messages) may respond to the initial sidelink message transmission with a feedback message. The feedback message may indicate a negative acknowledgement (NACK) (e.g., that the UE was unable to receive and decode the initial sidelink message transmission and is requesting a retransmission) or an acknowledgement (ACK) (e.g., that the UE received and decoded the initial sidelink message transmission and is requesting related sidelink message transmission(s)). Based on the one or more feedback messages received from at least some of the plurality of UEs, the sidelink UE may transmit a second set of sidelink messages (e.g., a set of one or more sidelink messages) to a subset of the plurality of UEs (e.g., one or more UEs that have responded with a feedback message). That is, subsequent sidelink transmissions (and corresponding directions for such subsequent transmissions) may be reduced relative to the earlier sidelink transmissions depending on feedback received in response to the earlier sidelink transmissions.

A method for wireless communication at a UE is described. The method may include transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs, receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs, and transmitting, based on the feedback message from the one or more UEs, a second set of sidelink messages in the one or more directions to the one or more UEs.

An apparatus for wireless communication at a UE is described. The apparatus may include a processor, memory coupled with the processor, and instructions stored in the memory. The instructions may be executable by the processor to cause the apparatus to transmit, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs, receive, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs, and transmit, based on the feedback message from the one or more UEs, a second set of sidelink messages in the one or more directions to the one or more UEs.

Another apparatus for wireless communication at a UE is described. The apparatus may include means for transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs, means for receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs, and means for transmitting, based on the feedback message from the one or more UEs, a second set of sidelink messages in the one or more directions to the one or more UEs.

A non-transitory computer-readable medium storing code for wireless communication at a UE is described. The code may include instructions executable by a processor to transmit, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs, receive, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs, and transmit, based on the feedback message from the one or more UEs, a second set of sidelink messages in the one or more directions to the one or more UEs.

Some examples of the method, apparatuses, and non-transitory computer-readable medium described herein may further include operations, features, means, or instructions for adjusting one or more beam directions for transmitting the second set of sidelink messages based on each received feedback message.

Some examples of the method, apparatuses, and non-transitory computer-readable medium described herein may further include operations, features, means, or instructions for identifying, based on the first set of sidelink messages, a feedback resource available for the feedback message, where the feedback message may be received based on the feedback resource.

In some examples of the method, apparatuses, and non-transitory computer-readable medium described herein, the first set of sidelink messages includes a set of multiple sidelink control messages and the second set of sidelink messages includes one or more sidelink data messages.

Some examples of the method, apparatuses, and non-transitory computer-readable medium described herein may further include operations, features, means, or instructions for identifying a repetition count for the set of multiple sidelink control messages, where the set of multiple sidelink control messages may be transmitted according to the repetition count.

Some examples of the method, apparatuses, and non-transitory computer-readable medium described herein may further include operations, features, means, or instructions for identifying a resource count for the set of multiple sidelink control messages, where the set of multiple sidelink control messages may be transmitted according to the resource count.

In some examples of the method, apparatuses, and non-transitory computer-readable medium described herein, the set of multiple sidelink control messages identify the one or more sidelink data messages.

In some examples of the method, apparatuses, and non-transitory computer-readable medium described herein, the first set of sidelink messages includes sidelink channel messages and the second set of sidelink messages includes a subset of the first set of sidelink messages.

Some examples of the method, apparatuses, and non-transitory computer-readable medium described herein may further include operations, features, means, or instructions for determining that the feedback message from the one or more UEs indicates that the one or more UEs were unable to successfully receive and decode the sidelink channel messages and identifying the one or more UEs based on the feedback message indicating the one or more UEs were unable to successfully receive and decode the sidelink channel messages, where transmitting the second set of sidelink messages in the one or more directions to the one or more UEs may be based on identifying the one or more UEs.

In some examples of the method, apparatuses, and non-transitory computer-readable medium described herein, the sidelink channel messages include one or more sidelink control messages, one or more sidelink data messages, or both.

DETAILED DESCRIPTION

Figure 1:
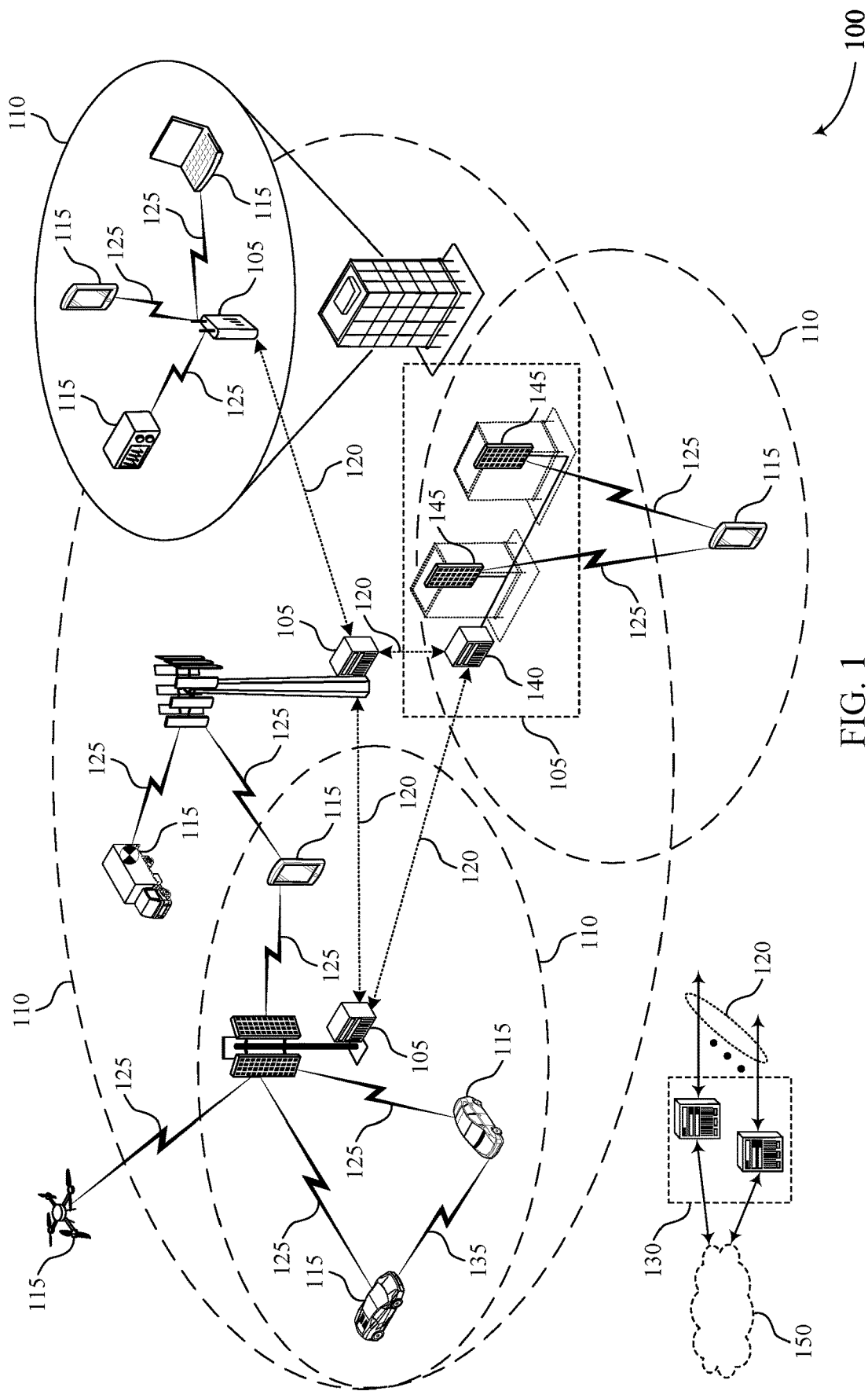
FIG. 1 illustrates an example of a wireless communications system that supports on demand sidelink retransmission for higher bands in accordance with aspects of the present disclosure.

Wireless communications systems may operate in higher radio frequency spectrum bands (e.g., 6 GHz or higher) using beamformed communications. Such higher operating frequency bands using beamforming may allow the transmitting device to transmit in a directional manner to achieve spatial diversity. For sidelink communications, this may mean a transmitting user equipment (UE) may perform an earlier transmission (e.g., an initial transmission) in all directions and then also perform retransmissions in all directions (e.g., such as for sidelink broadcast or sidelink groupcast transmissions or both). This results in resource and power waste for the transmitting UE. For example, the transmitting UE may be transmitting in directions where there are no sidelink UEs to receive or no UEs interested in receiving the sidelink transmission or both. Accordingly, performing earlier (e.g., initial) transmissions/retransmissions in a sweeping directional manner all directions (as done in other different wireless communications systems) may be inefficient.

Generally, the described techniques provide for more intelligent sidelink transmissions when the sidelink communications are in higher operating bands (e.g., 6+ GHz). For example, a sidelink UE may transmit a first set of sidelink messages in a plurality of directions using a corresponding plurality of transmit beams. The sidelink messages may be transmitted to a plurality of UEs (e.g., broadcast and/or groupcast sidelink transmissions). UE(s) receiving and/or interested in receiving related sidelink transmissions (e.g., retransmissions of the sidelink message and/or transmissions of related sidelink messages) may respond to the earlier (e.g., initial) sidelink message transmission with a feedback message. The feedback message may indicate a negative acknowledgement (NACK) (e.g., that the UE was unable to receive and decode the earlier (e.g., initial) sidelink message transmission and is requesting a retransmission) or an acknowledgement (ACK) (e.g., that the UE received and decoded the earlier (e.g., initial) sidelink message transmission and is requesting related sidelink message transmission(s)). Based on the feedback messages received from at least some of the plurality of UEs, the sidelink UE may transmit a second set of sidelink messages to a subset of the plurality of UEs (e.g., one or more UEs that have responded with a feedback message). That is, subsequent sidelink transmissions (and corresponding directions for such subsequent transmissions) may be reduced depending on feedback received in response to the earlier (e.g., initial) sidelink transmissions. As used herein, the terms set, subset, and other groups should be interpreted as one or more unless otherwise specifically noted.

Aspects of the disclosure are initially described in the context of wireless communications systems. Aspects of the disclosure are further illustrated by and described with reference to apparatus diagrams, system diagrams, and flowcharts that relate to on demand sidelink retransmission for higher bands.

FIG. 1 illustrates an example of a wireless communications system 100 that supports on demand sidelink retransmission for higher bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent a given supported subcarrier spacing (e.g., a maximum supported subcarrier spacing), and $N_f$ may represent a given supported discrete Fourier transform (DFT) size (e.g., a maximum supported DFT size). Time intervals of a communications resource may be organized according to radio frames each having a specified duration (e.g., 10 milliseconds (ms)).

Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a UE 115 configured for or otherwise supporting sidelink communications) may transmit, in a plurality of directions using a plurality of transmit beams of the UE 115, a first set of sidelink messages to a plurality of UEs, each transmit beam of the plurality of transmit beams associated with a respective direction of the plurality of directions and transmitting a respective sidelink message of the first set of sidelink messages to a respective UE 115 of the plurality of UEs. The UE 115 may receive, in one or more directions of the plurality of directions based at least in part on the first set of sidelink messages, a feedback message from one or more UEs that are a subset of the plurality of UEs, each feedback message indicating whether the sidelink message was able to be received and decoded by a respective UE 115 of the one or more UEs. The UE 115 may transmit, based at least in part on the feedback message from the one or more UEs, a second set of sidelink messages in the one or more directions to the one or more UEs.

Figure 2:
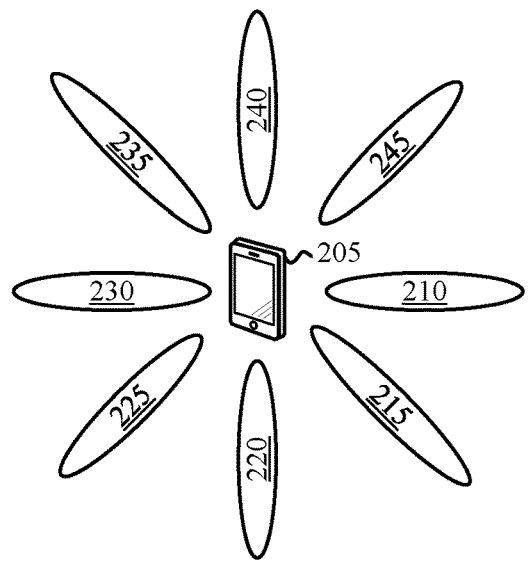
FIG. 2 illustrates an example of a wireless communications system that supports on demand sidelink retransmission for higher bands in accordance with aspects of the present disclosure.
Figure 2:
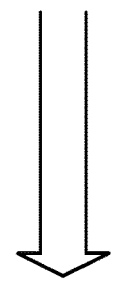
Figure 2:
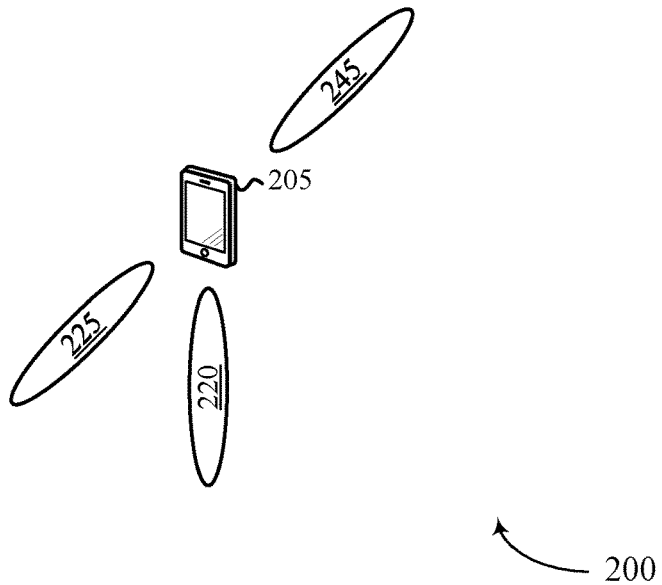

FIG. 2 illustrates an example of a wireless communications system 200 that supports on demand sidelink retransmission for higher bands in accordance with aspects of the present disclosure. Wireless communications system 200 may implement aspects of wireless communications system 100. Wireless communications system 200 may include UE 205, which may be an example of the corresponding device described herein. In some aspects, UE 205 may be configured or otherwise support sidelink communications (e.g., via a PC5 interface) using a plurality of transmit beams.

Wireless communications systems typically support sidelink communications, which include sidelink UEs (such as UE 205) performing UE-to-UE communications via one or more sidelink channels (e.g., such as within a V2X network and using a PC5 interface). Examples of the sidelink channels include, but are not limited to, a physical sidelink control channel (PSCCH), a physical sidelink shared channel (PSSCH), a sidelink feedback channel (PSFCH), and other channels operating according to the PC5 interface. For example, sidelink control information (SCI) may be used to schedule sidelink PSSCH transmissions, with the receiving UEs providing feedback via PSFCH carrying or otherwise conveying an indication of whether the sidelink UE was able to successfully receive and decode the sidelink transmission.

For example, wireless communications system 200 may support HARQ feedback for sidelink transmissions, which may be used to trigger sidelink retransmissions (e.g., such as when the feedback message indicates a NACK for the associated sidelink transmission). For example, in a unicast scenario (e.g., one-to-one) a first UE may transmit PSSCH to a second UE, with the second UE sending ACK/NACK feedback based on the result of its attempt to successfully receive and decode the PSSCH transmission. If NACK is indicated in the feedback, the first UE may retransmit the transport block (TB) (e.g., the TB conveyed in the initial sidelink transmission). This may also include broadcast or groupcast (e.g., one-to-many) transmissions where the first UE transmits PSSCH intended for UEs in the same group (e.g., such as in a groupcast scenario) or to UEs within a certain range of the first UE (e.g., such as in a broadcast scenario). A receiving UE (e.g., an intended UE within a group of UEs and/or a receiving UE proximate to the UE) may also send ACK/NACK feedback to the first UE (e.g., depending on the result of the attempted receiving and decoding operations at the receiving UE). Accordingly, the first UE in this scenario may retransmit the TB if the feedback message is received indicating NACK.

Wireless communications systems are typically configured to support such sidelink communications in lower radio frequency bands (e.g., <6 GHz, such as frequency range one (FR1)). Transmissions in such lower bands may use omnidirectional transmissions. For example, the first UE in this scenario may not apply beamforming techniques for transmissions in the lower bands so that any UE interested in the transmission can receive the signal. Accordingly, other different networks are not optimized to support sidelink/V2X communications in higher radio frequency bands (e.g., >6 GHz, such as mmW bands, frequency range two (FR2), frequency range 3 (FR3), frequency range four (FR4), and so on).

However, advanced wireless communications systems (such as wireless communications system 200) may support sidelink or other V2X communications in higher bands (e.g., such as in mmW bands, FR2-FR4 bands, as well as higher frequency ranges). This may provide a larger bandwidth available for sidelink/V2X communications, which may overall improve such communications complying with various requirements. As is understood, transmissions in higher bands tend to suffer more path loss, which increases the signal loss. To overcome the higher signal loss, sidelink transmissions in such higher bands may use beamforming techniques to enhance the signal strength in a particular direction. For example, UE 205 may be associated with a plurality of transmit beams, which may include transmit beam 210, transmit beam 215, transmit beam 220, transmit beam 225, transmit beam 230, transmit beam 235, transmit beam 240, and transmit beam 245. It is to be understood that the plurality of transmit beams supported by UE 205 may be more or fewer than the non-limiting example of eight transmit beams illustrated in FIG. 2.

For sidelink/V2X one-to-many (e.g., broadcast or groupcast) transmissions in higher bands, one straightforward solution is for the first UE to transmit a TB multiple times, with each transmission pointing in a different direction (e.g., a first transmission in the direction corresponding to transmit beam 210, a second transmission in the direction corresponding to transmit beam 215, and so on). This approach supports the receiving UE being able to receive the sidelink/V2X transmission regardless of which direction it is from the first UE. However, this approach is inefficient in some scenarios. For example, the first UE may need to transmit a TB M times towards M different directions to provide 360° coverage. If some directions have no receive UE interested in receiving the TB and/or some UEs failing to decode the TB, such a brute force sidelink/V2X transmission and then retransmission scheme may result in considerable waste of resources and power. That is, providing subsequent transmissions/retransmissions in directions where there are no receive UE and/or no receive UE interested in receiving the sidelink transmission wastes power at the first UE, as well as over the air resources, and introduces unnecessary signals into the channel, which may increase interference for other UE/base station in the area.

Accordingly, aspects of the described techniques provide various mechanisms to support more efficient sidelink transmissions and/or retransmissions in the one-to-many transmission scenario (e.g., broadcast and/or groupcast sidelink/V2X transmissions). Broadly, aspects of the described techniques support on-demand sidelink PSSCH (re)transmissions. The initial transmission of a TB (e.g., the TB carrying some or all of a sidelink message) from the first UE (UE 205 in this example) may cover a broad range of directions (e.g., 360°). Subsequent sidelink transmissions and/or retransmission of the initial sidelink transmission (e.g., the TB) may be on-demand, such as UE 205 only transmitting in the directions that have a requirement for the subsequent/retransmission of the sidelink TB. In some aspects, such on-demand sidelink subsequent transmissions/sidelink retransmissions may be based on UE 205 receiving NACK feedback from UE in a particular direction. In some examples, the initial transmission may be a sidelink control signaling transmission (e.g., stand-alone sidelink control transmission without a corresponding data packet), which covers a broad area (e.g., 360°). The subsequent data packet transmission (e.g., in PSSCH) can then be on-demand, such as being based on the received UE feedback. In some examples, the initial transmission may be an initial transmission of a data packet (e.g., PSCCH+PSSCH), which also covers a broad area (e.g., 360°). The subsequent retransmission can be on-demand and based on the receive UE feedback.

For example, UE 205 may be capable of, configured for, or otherwise support a plurality of transmit beams of the UE for transmitting in a corresponding plurality of directions. In the non-limiting example illustrated in FIG. 2, UE 205 supports performing directional transmissions using transmit beam 210 in a first direction, a transmit beam 215 in a second direction, a transmit beam 220 in the third direction, a transmit beam 225 in a fourth direction, a transmit beam 230 in a fifth direction, a transmit beam 235 in a sixth direction, transmit beam 240 in a seventh direction, and a transmit beam 240 in an eighth direction. However, UE 205 may be configured with more or fewer than eight transmit beams. In some aspects, each direction may be different from the other directions such that UE 205 transmitting using the plurality of transmit beams will correspondingly transmit in a plurality of directions (e.g., 360° coverage). Accordingly, each transmit beam may be associated with a specific direction in the plurality of directions.

In some aspects, UE 205 may use the plurality of transmit beams to transmit, in a plurality of directions, a first set of sidelink messages to a plurality of UEs. That is, UE 205 may be surrounded by one or more other UEs configured to, or otherwise supporting, receipt of sidelink transmissions from UE 205. In some aspects, the plurality of UEs may be performing sidelink communications with UE 205. Accordingly, UE 205 may therefore transmit a first sidelink message to each UE of the plurality of UEs depending on the location of the receiving UE with respect to UE 205 (e.g., depending on the direction). That is, UE 205 may transmit each sidelink message in the first set of sidelink messages to the plurality of UEs using the different transmit beams, with the location of the receiving UE determining which transmit beam of UE 205 that the first sidelink message is received on.

In some aspects, transmitting the first set of sidelink messages may be an example of a broadcast transmission and/or groupcast transmission to the plurality of UEs. In some examples, one or more UEs in the plurality of UEs may simply not receive the sidelink message transmission at all and may therefore not provide any feedback response to UE 205. In this example, UE 205 may determine that there are not interested receive UEs in that direction. In some examples, one or more UEs in the plurality of UEs may receive the sidelink message transmission but may be unable to successfully decode the sidelink message. In this situation, the receiving UE may provide a feedback message to UE 205 indicating NACK for the corresponding TB (e.g., the sidelink message). In some examples, one or more UEs in the plurality of UEs may receive and successfully decode the first sidelink message transmission. In this situation, the receiving UE may optionally provide a feedback message to UE 205 indicating ACK or NACK for the corresponding TB (e.g., the first sidelink message). For example, the receiving UE may indicate ACK in the feedback message to confirm successful receipt and decoding of the sidelink message. In another example, the receiving UE may indicate ACK or NACK in the feedback message to convey an indication that the receiving UE is interested in receiving subsequent sidelink message transmissions from UE 205 (e.g., depending on the configuration). In another example, the receiving UE may indicate ACK or NACK in the feedback message to convey an indication that the receiving UE is not interested in receiving subsequent sidelink message transmissions from UE 205 (e.g., depending on the configuration).

UE 205 may receive a feedback message from one or more UEs (e.g., a subset of UEs from the plurality of UEs), with each feedback message carrying or otherwise conveying an indication of whether the first sidelink message was able to be received and decoded by the respective UE (e.g., by the UE providing the feedback message to UE 205). UE 205 may receive the feedback message(s) from the subset of UEs in one or more directions (e.g., based on the first set of sidelink messages). That is, in the non-limiting example illustrated in FIG. 2, UE 205 may receive feedback message(s) from directions corresponding to transmit beam 220, transmit beam 225, and transmit beam 245. For example, UE 205 may use a receive beam corresponding to each of its available transmit beams to monitor for feedback message transmissions from any UE(s) responsive to transmitting the first set of sidelink messages. Accordingly, detecting a feedback message using the receive beam corresponding to transmit beam 245 may indicate to UE 205 that there is a UE located in that direction, and that the receiving UE is providing feedback responsive to it receiving a first sidelink message transmission from UE 205. Conversely, not detecting a feedback message using the receive beam corresponding to transmit beam 230, or others, may indicate to UE 205 that there are no UE located in that direction and/or no UE located in that direction that are interested in receiving follow-on sidelink transmissions from UE 205.

Accordingly, UE 205 may use the feedback messages from the one or more UEs to identify which transmit beam(s) from its plurality of transmit beams will be used for transmitting a second set of sidelink messages in the direction(s) that the feedback message(s) were received. Again, in the non-limiting example illustrated in FIG. 2, this may include UE 205 selecting transmit beam 220, transmit beam 225, and transmit beam 245 to transmit a second set of sidelink messages in the one or more directions to the one or more UEs (e.g., in the directions towards the UE(s) that provided feedback to UE 205).

In some examples, after the initial transmission, the next transmission (e.g., data packet transmission or retransmission) beam direction may be refined. For example, the initial transmission (e.g., the first set of sidelink messages) may have M beam directions, with M corresponding to eight in the non-limiting example illustrated in FIG. 2. Based on the received feedback messages, UE 205 may determine that the next data transmission/retransmission will be towards M1 beam directions, with M1 being equal to or less than M. In the non-limiting example illustrated in FIG. 2, M1 is equal to three (e.g., the three directions corresponding to transmit beam 220, transmit beam 225, and transmit beam 245). In some examples, UE 205 may refine the transmit beams for the M1 beam directions. For example, each of the M1 beam directions may correspond to a course beam, and UE 205 may form N refined beams that are finer beams (e.g., narrower). In another example, UE 205 may adjust various analog and/or digital beamforming parameters, configurations, values, weighting factors, and the like, to refine each M1 beam direction. UE 205 may transmit the N refined beams for each course beam direction that is interested in receiving a data packet transmission/retransmission. Accordingly, UE 205 may modify, adjust, and the like, one or more beam directions for transmitting the second set of sidelink messages based at least in part on the received feedback.

In some aspects, the second set of sidelink messages may be the same as (e.g., retransmissions) the first set of sidelink messages. In other examples, the second set of sidelink messages may be different from, but related to, the first set of sidelink messages.

Accordingly, in a first option the first set of sidelink messages include a plurality of and/or at least one sidelink control message (e.g., SCI-1, SCI-2, and/or other sidelink control/data messages), with the second set of sidelink messages including a plurality of and/or at least one sidelink data message (e.g., PSCCH, PSSCH, and/or other sidelink control/data messages). For example, the sidelink control messages may identify or otherwise convey information regarding the sidelink data messages (e.g., such as a grant of resources for the sidelink data messages). Accordingly, UE 205 may transmit stand-alone sidelink control signaling (e.g., the first set of sidelink messages). The sidelink control signaling may be repeated M times over M different beam directions. In some examples, the M transmissions can be in M orthogonal resources (e.g., M different time and/or frequency resources). In some examples, the M transmissions can be in the same time and/or frequency resource (e.g., UE 205 may be able to form M beams simultaneously for transmission towards M beam directions). In some examples, some of the M transmissions may be in the same time and/or frequency resources, while the other M transmissions may be a different time and/or frequency resources.

In some aspects, each of the M transmissions may have an associated index or other identifier. For example, in the sidelink control signaling there may be a parameter indicating an index value (e.g., such as a beam index). Each of the M indices may be mapped to a feedback resource (e.g., time, frequency, and/or code resources). A different M index may be mapped to a different feedback resource (e.g., such that the M different feedback resources are needed for UE 205).

The sidelink control signaling may indicate a sidelink data packet transmission in the future. For example, the sidelink control signaling (e.g., SCI-1 and/or SCI-2) may schedule an upcoming sidelink data transmission (e.g., a PSSCH transmission).

Accordingly, any receive UEs interested in receiving the sidelink data transmission may send feedback to the transmitting UE (e.g., UE 205). In some examples, this may include a receiving UE being in the same group as the transmitting UE in a groupcast communication. In some examples, the receiving UE may be within a minimum communication range indicated in the sidelink control signaling. In some aspects, the feedback may be HARQ feedback (e.g., the receiving UE may send NACK to indicate a desire for data packet reception, such as the second sidelink message). Accordingly, the receiving UE interested in receiving a UE 205 data packet may transmit feedback in the feedback resource that corresponds to the beam index of the decoded initial transmission (e.g., the transmit beam carrying the first sidelink message received by the receiving UE). In some examples, if a receiving UE can decode more than one of the M initial transmissions, the receiving UE may select the feedback resource that corresponds to the strongest beam direction for the feedback (e.g., based on RSRP measurement from the decoded initial transmissions).

UE 205 may transmit the data packet (e.g., the second set of sidelink messages) in the beam directions that UE 205 has received feedback from. As discussed, the receiving UE feedback and the beam direction may have correspondence. For example, there may be M feedback resources, with each of the M feedback resources corresponding to one of the M beam directions. Based on the resource index that feedback is received on, UE 205 may know the beam direction that it should transmit the subsequent data packet (e.g., the second set of sidelink messages).

Accordingly, upon detection of feedback messages, UE 205 may transmit the data packet in the desired beam direction. For example, UE 205 may have received feedback in M1<M feedback resources, which may indicate that only those M1 beam directions have interested receiving UE. UE 205 will transmit the data packet (e.g., the second set of sidelink messages) in the M1 beam directions.

In some aspects, the subsequent retransmission of the data packet (e.g., the second set of sidelink messages) may be based on the feedback messages received by UE 205. For example, some intended receiving UEs may fail to successfully decode the data packet (e.g., the second set of sidelink messages). These receiving UEs may then transmit a NACK indication in another feedback message to UE 205. UE 205 may then retransmit the packet in the beam direction that the NACK was received from.

Accordingly, UE 205 may identify or otherwise determine a repetition count and/or resource count for the plurality of sidelink control messages. In this context, the plurality of sidelink control messages may be transmitted according to the repetition and/or resource count.

In another option, the initial transmission (e.g., the first set of sidelink messages) may also have the data packet. That is, the first set of sidelink messages may include sidelink channel messages (e.g., PSCCH and/or PSSCH) and the second set of sidelink messages may include a subset of the first set of sidelink messages. For example, the transmission may be a TB, with this TB being transmitted over multiple directions (e.g., based on different precoding weights and/or beamforming). In this context, one transmission may refer to one message, and the subset of messages may refer to the subset of the transmissions (or transmission directions).

Accordingly, in this option the initial transmission may be sent over a broader directions (e.g., cover all M beam directions). Retransmissions (e.g., the second set of sidelink messages, which are retransmissions of, or subsets of, the first set of sidelink messages) may be sent only in the beam directions from which a NACK indication in a feedback message was received. In some examples, some of the receive UEs may still not be able to decode the data packet after the first retransmission. These UEs may send another NACK feedback, and UE 205 may perform another retransmission. Again, the retransmission in this example may be only provided in the directions from which the NACK feedback was received.

Accordingly, UE 205 may identify or otherwise determine that the feedback message from the one or more UEs indicates that those UEs were unable to successfully receive and decode the sidelink channel message (e.g., PSCCH and/or PSSCH messages). In this context, UE 205 may identify or otherwise determine the one or more UEs based on the feedback message indicating that those UEs were unable to respectfully receive and decode the sidelink channel messages. Accordingly, UE 205 may identify the one or more UEs based on the feedback message received from each responding UE.

Figure 3:
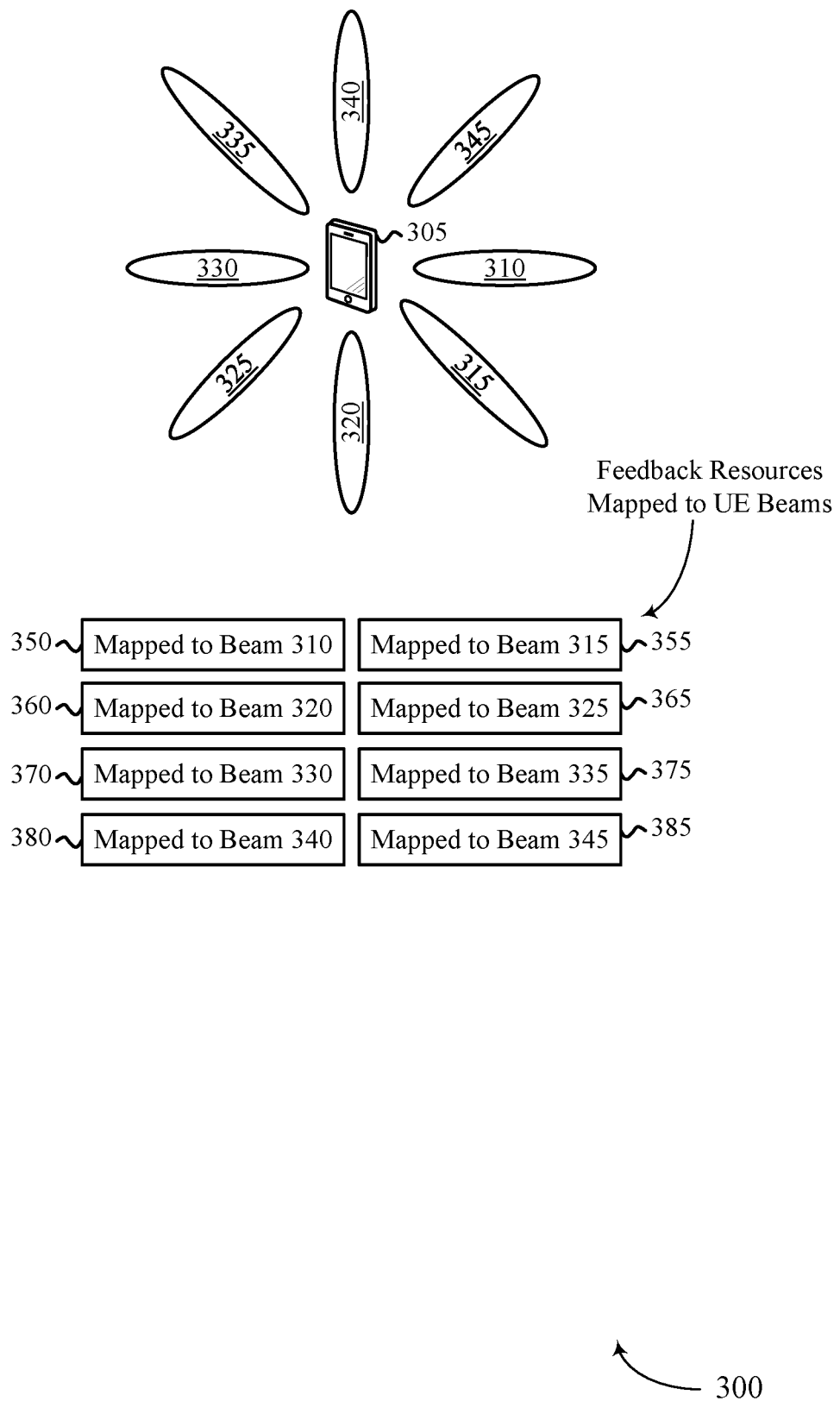
FIG. 3 illustrates an example of a wireless communications system that supports on demand sidelink retransmission for higher bands in accordance with aspects of the present disclosure.

FIG. 3 illustrates an example of a wireless communications system 300 that supports on demand sidelink retransmission for higher bands in accordance with aspects of the present disclosure. Wireless communications system 300 may implement aspects of wireless communication systems 100 and/or 200. Wireless communications system 300 may include UE 305, which may be an example of the corresponding device described herein. In some aspects, UE 305 may be configured or otherwise support sidelink communications (e.g., via a PC5 interface) using a plurality of transmit beams.

As discussed above, aspects of the described techniques may support on-demand (re)transmissions of sidelink messages based on received feedback. For example, UE 305 may be configured with, or otherwise support performing beamformed transmissions in a corresponding plurality of directions. This may include each transmit beam of UE 305 being associated with a corresponding beam direction. For example, UE 305 may support a plurality of transmit beams, with eight transmit beams being shown by way of example only. This may include UE 305 supporting beamformed transmissions in a first direction using transmit beam 310, in a second direction using transmit beam 315, in a third direction using transmit beam 320, in a fourth direction using transmit beam 325, in a fifth direction using transmit beam 330, in a sixth direction using transmit beam 335, in a seventh direction using transmit beam 340, and in an eighth direction using transmit beam 345.

Accordingly, UE 305 may use the plurality of transmit beams to transmit, in the corresponding plurality of directions, a first set of sidelink messages to a plurality of UEs. As discussed, each transmit beam of UE 305 is associated with a different direction. Accordingly, transmitting the plurality of sidelink messages in each direction may include transmitting a first sidelink message to the UE located in that respective direction.

UE 305 may then monitor feedback resources to receive feedback message(s) in one or more directions of the plurality of directions. The feedback message(s) may be received from one or more UEs (e.g., a subset of UEs of the plurality of UEs). Broadly, each feedback message may carry or otherwise convey an indication of whether the respective UE was able to successfully receive and decode the first sidelink message (e.g., ACK/NACK).

As discussed above, in some examples there may be a correspondence between the transmit beams of UE 305 (e.g., beam index) and the associated feedback resource (e.g., time, frequency, spatial, and/or code resource). For example, UE 305 may identify or otherwise determine a feedback resource available for the responding UEs to provide the feedback message(s). This may include each feedback resource being mapped to a corresponding transmit beam of the M transmit directions. In the non-limiting example illustrated in FIG. 3, this may include feedback resource 350 being mapped to transmit beam 310, feedback resource 355 being mapped to transmit beam 315, feedback resource 360 being mapped to transmit beam 320, feedback resource 365 being mapped to transmit beam 325, feedback resource 370 being mapped to transmit beam 330, feedback resource 375 being mapped to transmit beam 335, feedback resource 380 being mapped to transmit beam 340, and feedback resource 385 being mapped to transmit beam 345.

Accordingly, UE 305 may use a receive beam corresponding to each of its transmit beams to monitor the mapped feedback resource for feedback message(s) from the subset of UEs. Detecting feedback message(s) on a particular feedback resource may indicate to UE 305 that there is a UE in the corresponding direction interested in receiving subsequent sidelink transmissions from UE 305 (e.g., a second sidelink message). Not detecting feedback message(s) on a particular feedback resource may indicate to UE 305 that there are no UE in the corresponding direction interested in receiving subsequent sidelink transmissions from UE 305 (e.g., a second sidelink message). Accordingly, UE 305 may transmit a second set of sidelink messages in the one or more directions from which feedback messages were received.

Figure 4:
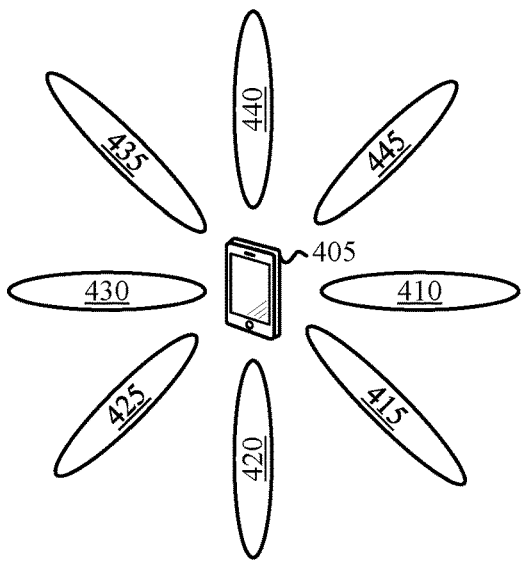
FIG. 4 illustrates an example of a wireless communications system that supports on demand sidelink retransmission for higher bands in accordance with aspects of the present disclosure.
Figure 4:
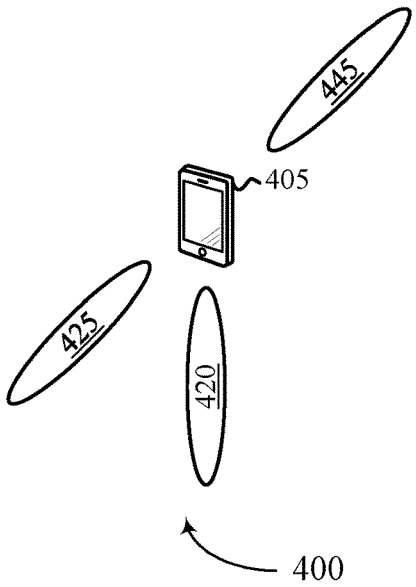

FIG. 4 illustrates an example of a wireless communications system 400 that supports on demand sidelink retransmission for higher bands in accordance with aspects of the present disclosure. Wireless communications system 400 may implement aspects of wireless communication systems 100, 200 and/or 300. Wireless communications system 400 may include UE 405, which may be an example of the corresponding device described herein. In some aspects, UE 405 may be configured or otherwise support sidelink communications (e.g., via a PC5 interface) using a plurality of transmit beams.

As discussed above, aspects of the described techniques may support on-demand (re)transmissions of sidelink messages based on received feedback. For example, UE 405 may be configured with, or otherwise support performing beamformed transmissions in a corresponding plurality of directions. This may include each transmit beam of UE 405 being associated with a corresponding beam direction. For example, UE 405 may support a plurality of transmit beams, with eight transmit beams being shown by way of example only. This may include UE 405 supporting beamformed transmissions in a first direction using transmit beam 410, in a second direction using transmit beam 415, in a third direction using transmit beam 420, in a fourth direction using transmit beam 425, in a fifth direction using transmit beam 430, in a sixth direction using transmit beam 435, in a seventh direction using transmit beam 440, and in an eighth direction using transmit beam 445.

Accordingly, UE 405 may use the plurality of transmit beams to transmit, in the corresponding plurality of directions, a first set of sidelink messages to a plurality of UEs. As discussed, each transmit beam of UE 305 is associated with a different direction. Accordingly, transmitting the plurality of sidelink messages in each direction may include transmitting a first sidelink message to the UE located in that respective direction.

UE 405 may then monitor feedback resources to receive feedback message(s) in one or more directions of the plurality of directions. The feedback message(s) may be received from one or more UEs (e.g., a subset of UEs of the plurality of UEs). Broadly, each feedback message may carry or otherwise convey an indication of whether the respective UE was able to successfully receive and decode the first sidelink message (e.g., ACK/NACK).

As discussed above, in some examples there may be a correspondence between the transmit beams of UE 405 (e.g., beam index) and the associated feedback resource (e.g., time, frequency, spatial, and/or code resource). For example, UE 405 may identify or otherwise determine a feedback resource available for the responding UEs to provide the feedback message(s). This may include each feedback resource being mapped to a corresponding transmit beam of the M transmit directions. In the non-limiting example illustrated in FIG. 4, this may include feedback resource 450 being mapped to transmit beam 410, feedback resource 455 being mapped to transmit beam 415, feedback resource 460 being mapped to transmit beam 420, feedback resource 465 being mapped to transmit beam 425, feedback resource 470 being mapped to transmit beam 430, feedback resource 475 being mapped to transmit beam 435, feedback resource 480 being mapped to transmit beam 440, and feedback resource 485 being mapped to transmit beam 445.

Accordingly, UE 405 may use a receive beam corresponding to each of its transmit beams to monitor the mapped feedback resource for feedback message(s) from the subset of UEs. Detecting feedback message(s) on a particular feedback resource may indicate to UE 405 that there is a UE in the corresponding direction interested in receiving subsequent sidelink transmissions from UE 405 (e.g., a second sidelink message). Not detecting feedback message(s) on a particular feedback resource may indicate to UE 405 that there are no UE in the corresponding direction interested in receiving subsequent sidelink transmissions from UE 405 (e.g., a second sidelink message). In the non-limiting example illustrated in FIG. 4, this may include UE 405 receiving feedback messages in feedback resource 460, feedback resource 465, and in feedback resource 485. This may indicate to UE 405 that there the subset of UEs includes UEs located in the third direction corresponding to transmit beam 420, in the fourth direction corresponding to transmit beam 425, and in the eighth direction corresponding to transmit beam 445.

Accordingly, UE 405 may transmit a second set of sidelink messages in the one or more directions from which feedback messages were received. In the non-limiting example illustrated in FIG. 4, this may include UE 405 transmitting a second sidelink message to the one or more UEs using transmit beam 420, transmit beam 425, and transmit beam 445 (e.g., the directions from which feedback messages were received).

Figure 5:
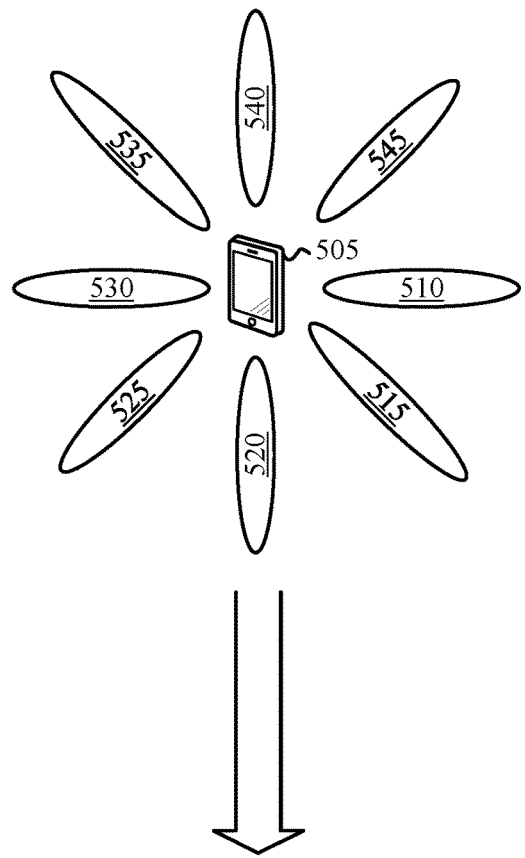
FIG. 5 illustrates an example of a wireless communications system that supports on demand sidelink retransmission for higher bands in accordance with aspects of the present disclosure.
Figure 5:
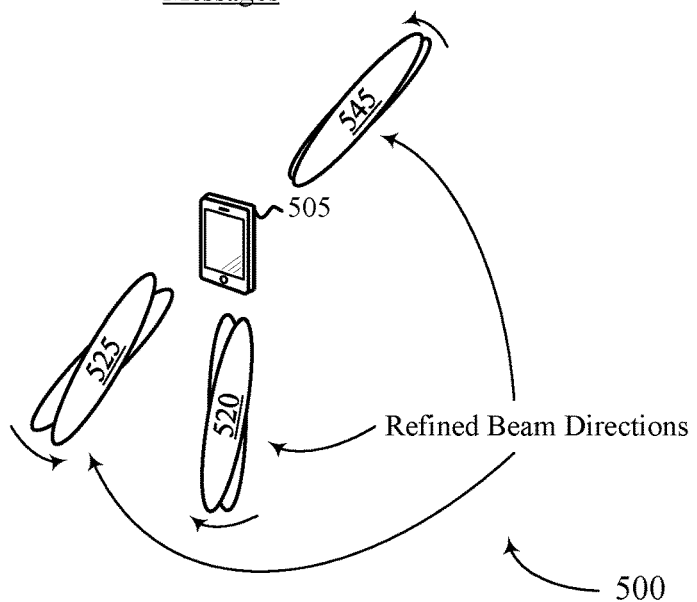

FIG. 5 illustrates an example of a wireless communications system 500 that supports on demand sidelink retransmission for higher bands in accordance with aspects of the present disclosure. Wireless communications system 500 may implement aspects of wireless communication systems 100, 200, 300 and/or 400. Wireless communications system 500 may include UE 505, which may be an example of the corresponding device described herein. In some aspects, UE 505 may be configured or otherwise support sidelink communications (e.g., via a PC5 interface) using a plurality of transmit beams.

As discussed above, aspects of the described techniques may support on-demand (re)transmissions of sidelink messages based on received feedback. For example, UE 505 may be configured with, or otherwise support performing beamformed transmissions in a corresponding plurality of directions. This may include each transmit beam of UE 505 being associated with a corresponding beam direction. For example, UE 505 may support a plurality of transmit beams, with eight transmit beams being shown by way of example only. This may include UE 505 supporting beamformed transmissions in a first direction using transmit beam 510, in a second direction using transmit beam 515, in a third direction using transmit beam 520, in a fourth direction using transmit beam 525, in a fifth direction using transmit beam 530, in a sixth direction using transmit beam 535, in a seventh direction using transmit beam 540, and in an eighth direction using transmit beam 545.

Accordingly, UE 505 may use the plurality of transmit beams to transmit, in the corresponding plurality of directions, a first set of sidelink messages to a plurality of UEs. As discussed, each transmit beam of UE 505 is associated with a different direction. Accordingly, transmitting the plurality of sidelink messages in each direction may include transmitting a first sidelink message to the UE located in that respective direction.

UE 505 may then monitor feedback resources to receive feedback message(s) in one or more directions of the plurality of directions. The feedback message(s) may be received from one or more UEs (e.g., a subset of UEs of the plurality of UEs). Broadly, each feedback message may carry or otherwise convey an indication of whether the respective UE was able to successfully receive and decode the first sidelink message (e.g., ACK/NACK). As discussed above, in some examples there may be a correspondence between the transmit beams of UE 505 (e.g., beam index) and the associated feedback resource (e.g., time, frequency, spatial, and/or code resource).

Accordingly, UE 505 may use a receive beam corresponding to each of its transmit beams to monitor the mapped feedback resource for feedback message(s) from the subset of UEs. Detecting feedback message(s) on a particular feedback resource may indicate to UE 505 that there is a UE in the corresponding direction interested in receiving subsequent sidelink transmissions from UE 505 (e.g., a second sidelink message). Not detecting feedback message(s) on a particular feedback resource may indicate to UE 505 that there are no UE in the corresponding direction interested in receiving subsequent sidelink transmissions from UE 505 (e.g., a second sidelink message). Accordingly, UE 505 may transmit a second set of sidelink messages in the one or more directions from which feedback messages were received.

As also discussed above, in some examples UE 505 may adjust or otherwise modify one or more beam directions (e.g., adjust the transmit beam) for transmitting the second set of sidelink messages based on the receive feedback message(s). That is, for each of the M1 bean directions, UE 505 may refine the transmit beam for transmit beams being used to transmit the second set of sidelink messages. This may include UE 505 modifying or otherwise adjusting beamforming directions, beamform shapes, coarse-to-fine beam adjustments, beamforming configuration/parameters/values, and the like. For example, UE 505 may receive one or more instances of a feedback message and determine the direction of the associated UE based on the RSRP values of the received feedback messages. Accordingly, UE 505 may refine the transmit beams to generate or otherwise obtain refined transmit beams for transmitting the second set of sidelink messages to the one or more UEs. In the non-limiting example illustrated in FIG. 5, this may include UE 505 adjusting one or more of transmit beam 520, transmit beam 525, and transmit beam 545.

Figure 6:
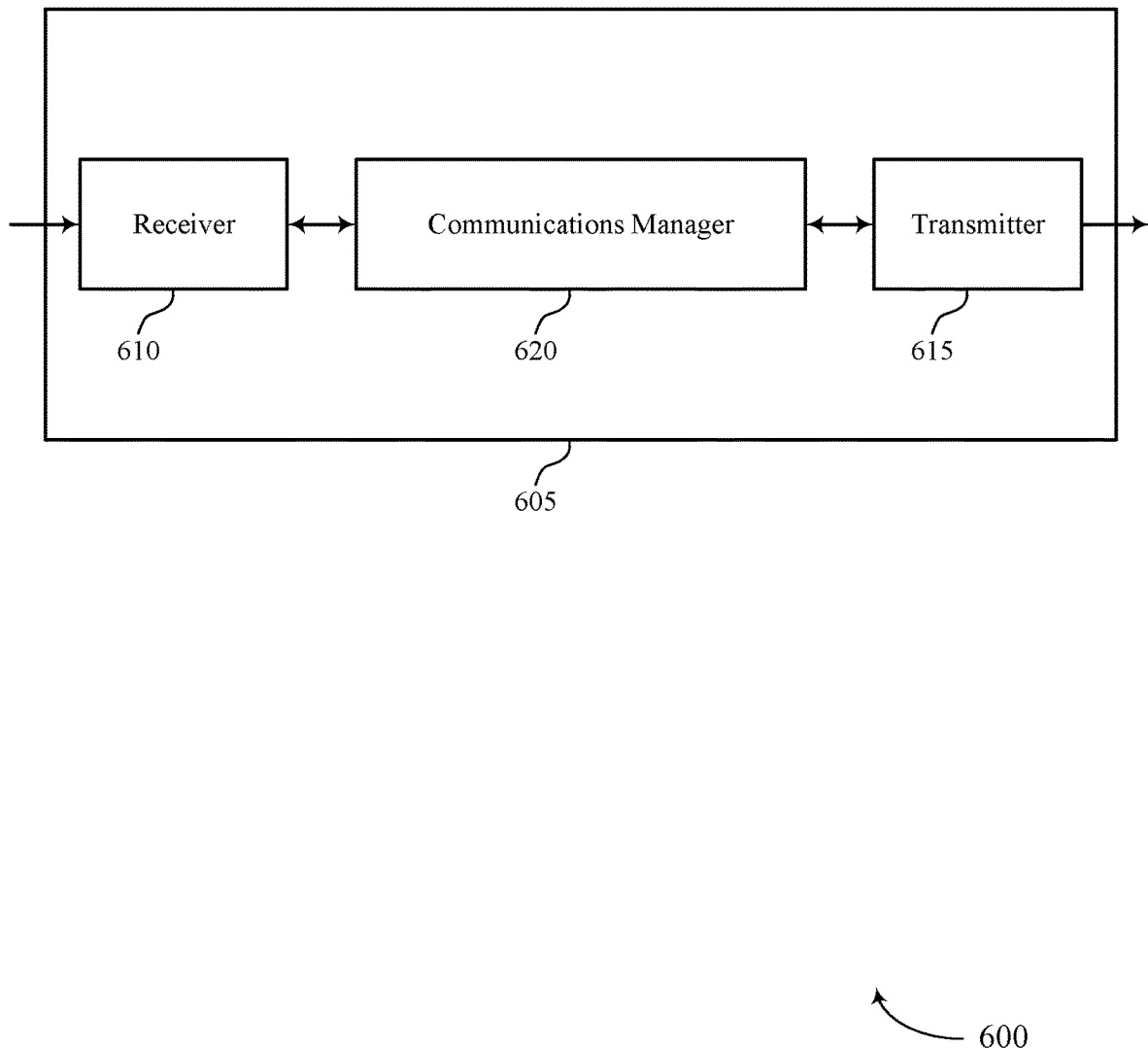
FIGS. 6 and 7 show block diagrams of devices that support on demand sidelink retransmission for higher bands in accordance with aspects of the present disclosure.

FIG. 6 shows a block diagram 600 of a device 605 that supports on demand sidelink retransmission for higher bands in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to on demand sidelink retransmission for higher bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to on demand sidelink retransmission for higher bands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of on demand sidelink retransmission for higher bands as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The communications manager 620 may be configured as or otherwise support a means for receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The communications manager 620 may be configured as or otherwise support a means for transmitting, based on the feedback message from the one or more UEs, a second set of sidelink messages in the one or more directions to the one or more UEs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for on-demand sidelink (re)transmissions based on HARQ feedback received responsive to initial sidelink transmissions. The on-demand sidelink (re)transmissions minimize over-the-air resources, and power, of the sidelink UE, as well as reduce channel interference due to the reduced (re)transmissions.

Figure 7:
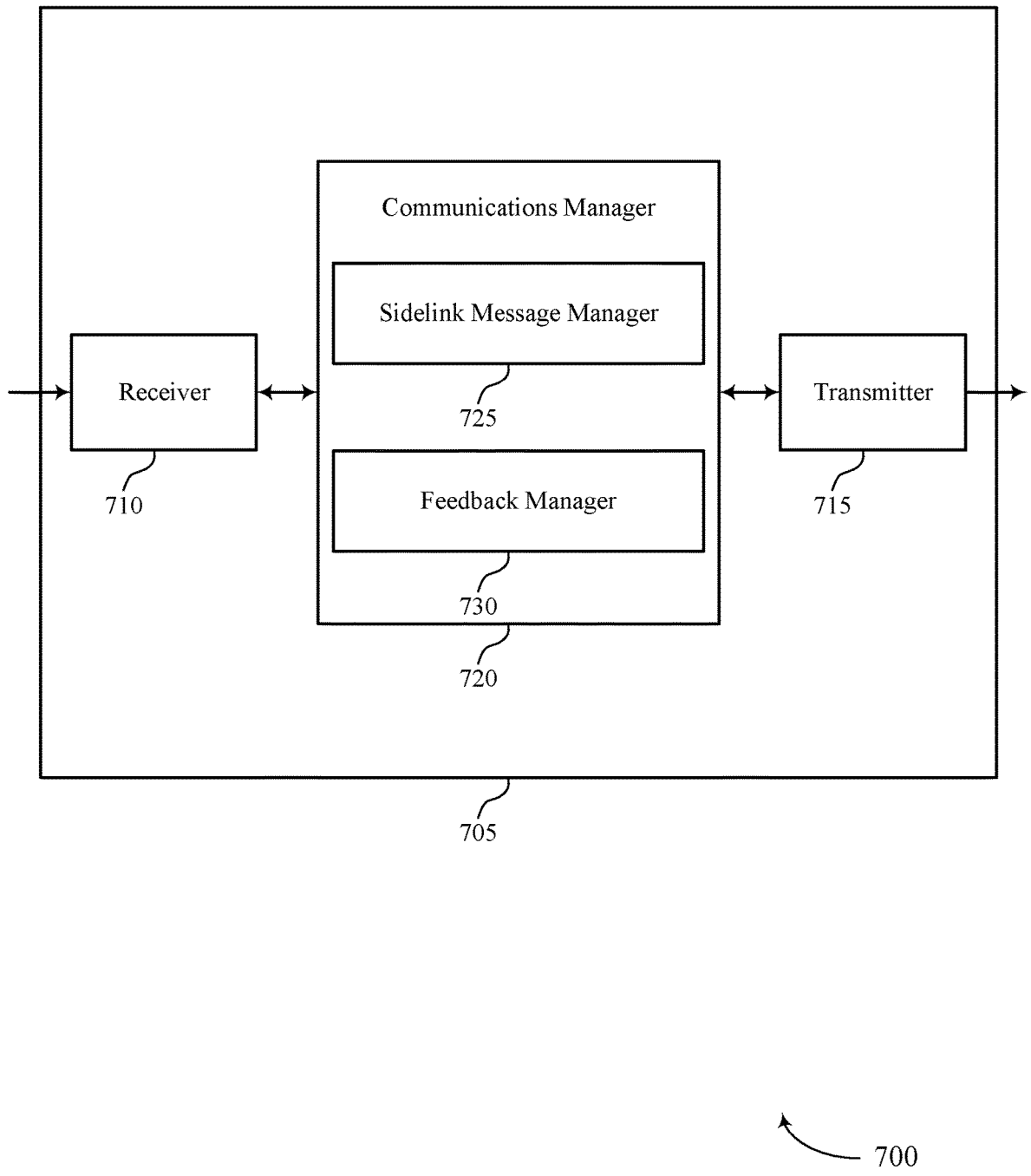

FIG. 7 shows a block diagram 700 of a device 705 that supports on demand sidelink retransmission for higher bands in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to on demand sidelink retransmission for higher bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to on demand sidelink retransmission for higher bands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of on demand sidelink retransmission for higher bands as described herein. For example, the communications manager 720 may include a sidelink message manager 725 a feedback manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The sidelink message manager 725 may be configured as or otherwise support a means for transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The feedback manager 730 may be configured as or otherwise support a means for receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The sidelink message manager 725 may be configured as or otherwise support a means for transmitting, based on the feedback message from the one or more UEs, a second set of sidelink messages in the one or more directions to the one or more UEs.

Figure 8:
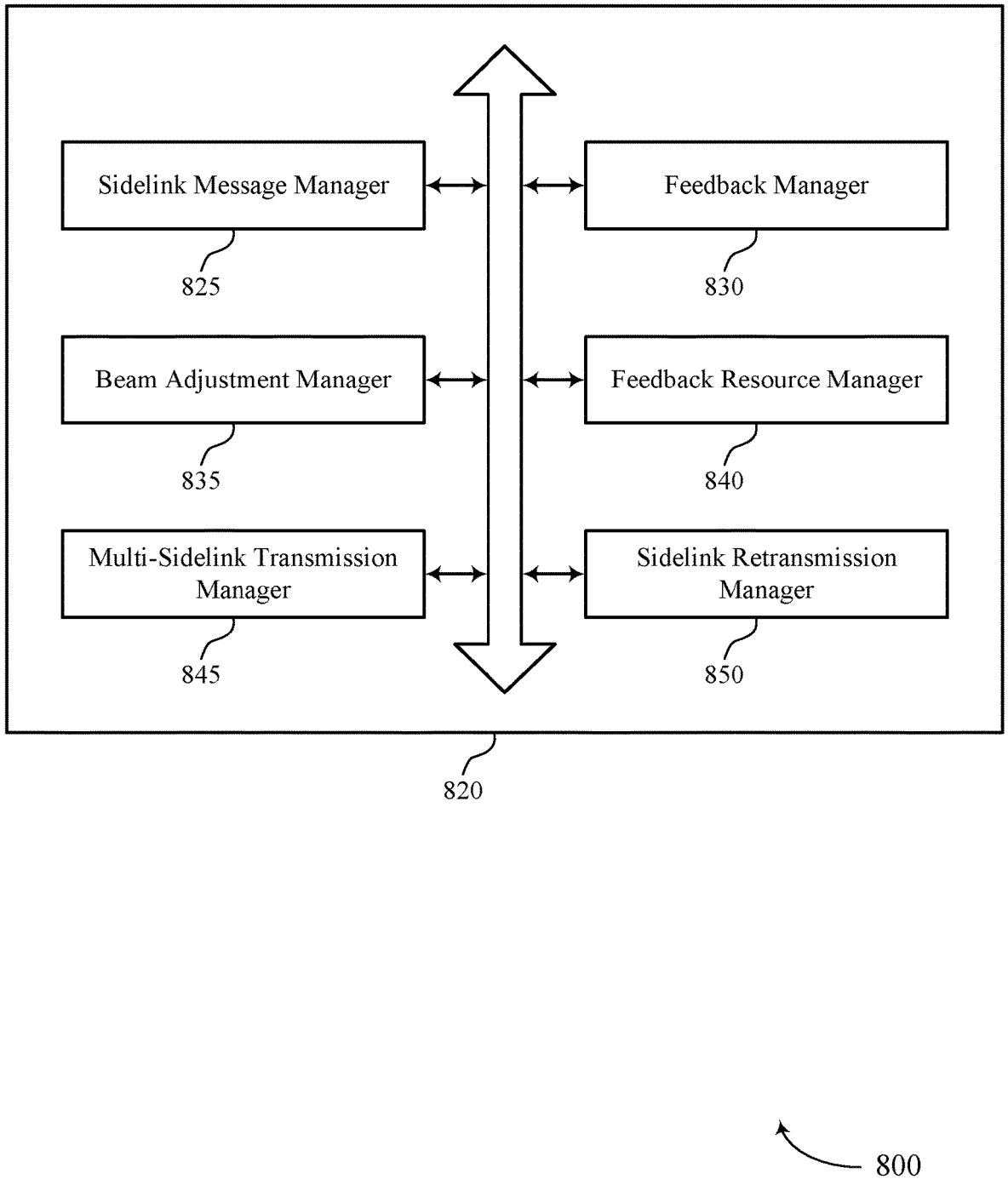
FIG. 8 shows a block diagram of a communications manager that supports on demand sidelink retransmission for higher bands in accordance with aspects of the present disclosure.

FIG. 8 shows a block diagram 800 of a communications manager 820 that supports on demand sidelink retransmission for higher bands in accordance with aspects of the present disclosure. The communications manager 820 may be an example of aspects of a communications manager 620, a communications manager 720, or both, as described herein. The communications manager 820, or various components thereof, may be an example of means for performing various aspects of on demand sidelink retransmission for higher bands as described herein. For example, the communications manager 820 may include a sidelink message manager 825, a feedback manager 830, a beam adjustment manager 835, a feedback resource manager 840, a multi-sidelink transmission manager 845, a sidelink retransmission manager 850, or any combination thereof. Each of these components may communicate, directly or indirectly, with one another (e.g., via one or more buses).

The communications manager 820 may support wireless communication at a UE in accordance with examples as disclosed herein. The sidelink message manager 825 may be configured as or otherwise support a means for transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The feedback manager 830 may be configured as or otherwise support a means for receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. In some examples, the sidelink message manager 825 may be configured as or otherwise support a means for transmitting, based on the feedback message from the one or more UEs, a second set of sidelink messages in the one or more directions to the one or more UEs.

In some examples, the beam adjustment manager 835 may be configured as or otherwise support a means for adjusting one or more beam directions for transmitting the second set of sidelink messages based on each received feedback message.

In some examples, the feedback resource manager 840 may be configured as or otherwise support a means for identifying, based on the first set of sidelink messages, a feedback resource available for the feedback message, where the feedback message is received based on the feedback resource. In some examples, the first set of sidelink messages includes a set of multiple sidelink control messages and the second set of sidelink messages includes one or more sidelink data messages.

In some examples, the multi-sidelink transmission manager 845 may be configured as or otherwise support a means for identifying a repetition count for the set of multiple sidelink control messages, where the set of multiple sidelink control messages are transmitted according to the repetition count. In some examples, the multi-sidelink transmission manager 845 may be configured as or otherwise support a means for identifying a resource count for the set of multiple sidelink control messages, where the set of multiple sidelink control messages are transmitted according to the resource count. In some examples, the set of multiple sidelink control messages identify the one or more sidelink data messages. In some examples, the first set of sidelink messages includes sidelink channel messages and the second set of sidelink messages includes a subset of the first set of sidelink messages.

In some examples, the sidelink retransmission manager 850 may be configured as or otherwise support a means for determining that the feedback message from the one or more UEs indicates that the one or more UEs were unable to successfully receive and decode the sidelink channel messages. In some examples, the sidelink retransmission manager 850 may be configured as or otherwise support a means for identifying the one or more UEs based on the feedback message indicating the one or more UEs were unable to successfully receive and decode the sidelink channel messages, where transmitting the second set of sidelink messages in the one or more directions to the one or more UEs is based on identifying the one or more UEs. In some examples, the sidelink channel messages include one or more sidelink control messages, one or more sidelink data messages, or both.

Figure 9:
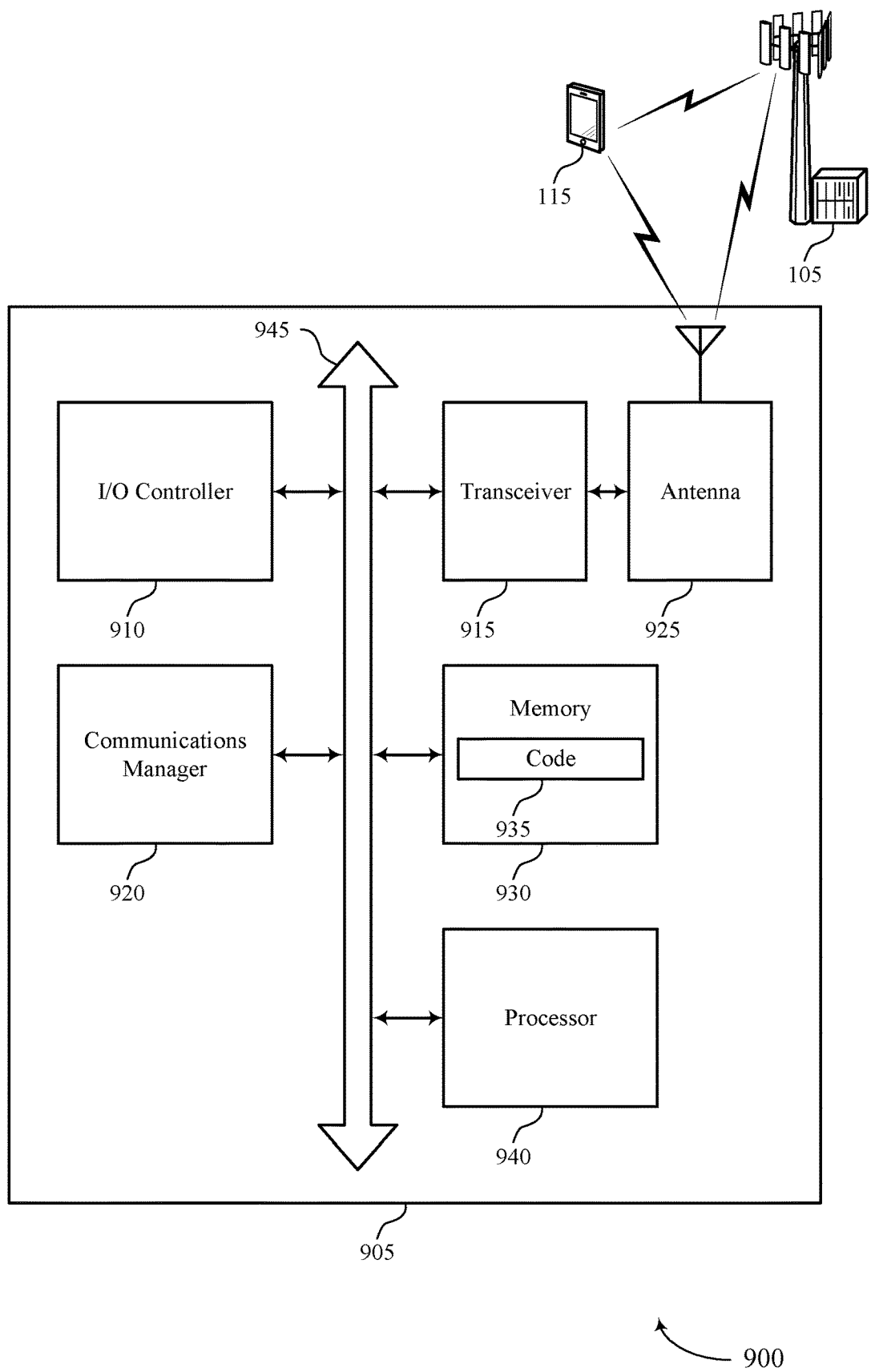
FIG. 9 shows a diagram of a system including a device that supports on demand sidelink retransmission for higher bands in accordance with aspects of the present disclosure.

FIG. 9 shows a diagram of a system 900 including a device 905 that supports on demand sidelink retransmission for higher bands in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting on demand sidelink retransmission for higher bands). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The communications manager 920 may be configured as or otherwise support a means for receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The communications manager 920 may be configured as or otherwise support a means for transmitting, based on the feedback message from the one or more UEs, a second set of sidelink messages in the one or more directions to the one or more UEs.

By including or configuring the communications manager 920 in accordance with examples as described herein, the device 905 may support techniques for on-demand sidelink (re)transmissions based on HARQ feedback received responsive to initial sidelink transmissions. The on-demand sidelink (re)transmissions minimize over-the-air resources, and power, of the sidelink UE, as well as reduce channel interference due to the reduced (re)transmissions.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of on demand sidelink retransmission for higher bands as described herein, or the processor 940 and the memory 930 may be otherwise configured to perform or support such operations.

Figure 10:
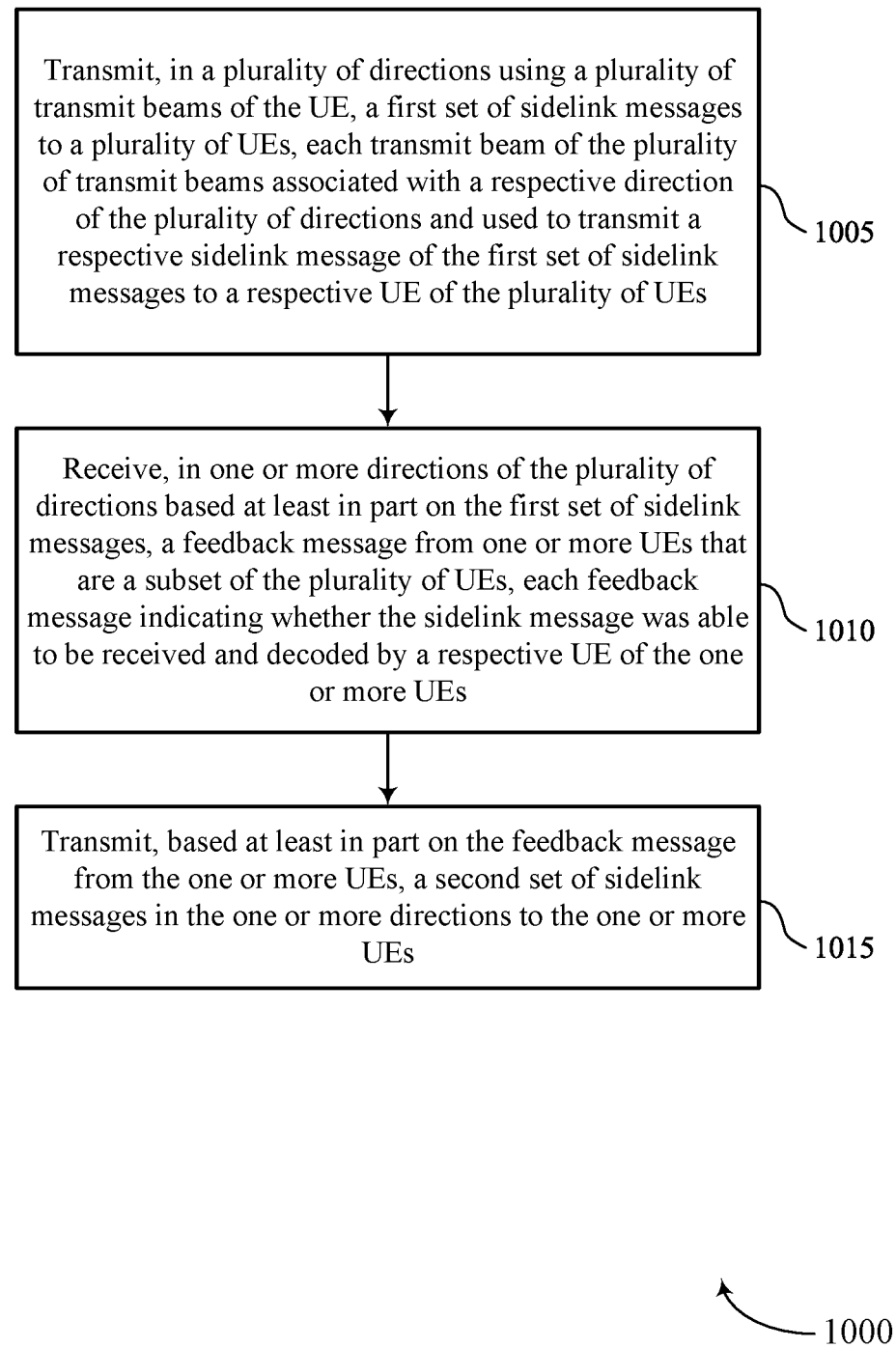
FIGS. 10 through 12 show flowcharts illustrating methods that support on demand sidelink retransmission for higher bands in accordance with aspects of the present disclosure.

FIG. 10 shows a flowchart illustrating a method 1000 that supports on demand sidelink retransmission for higher bands in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The operations of 1005 may be performed in accordance with examples as disclosed herein. In some examples, aspects of the operations of 1005 may be performed by a sidelink message manager 825 as described with reference to FIG. 8.

At 1010, the method may include receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The operations of 1010 may be performed in accordance with examples as disclosed herein.

In some examples, aspects of the operations of 1010 may be performed by a feedback manager 830 as described with reference to FIG. 8.

At 1015, the method may include transmitting, based on the feedback message from the one or more UEs, a second set of sidelink messages in the one or more directions to the one or more UEs. The operations of 1015 may be performed in accordance with examples as disclosed herein. In some examples, aspects of the operations of 1015 may be performed by a sidelink message manager 825 as described with reference to FIG. 8.

Figure 11:
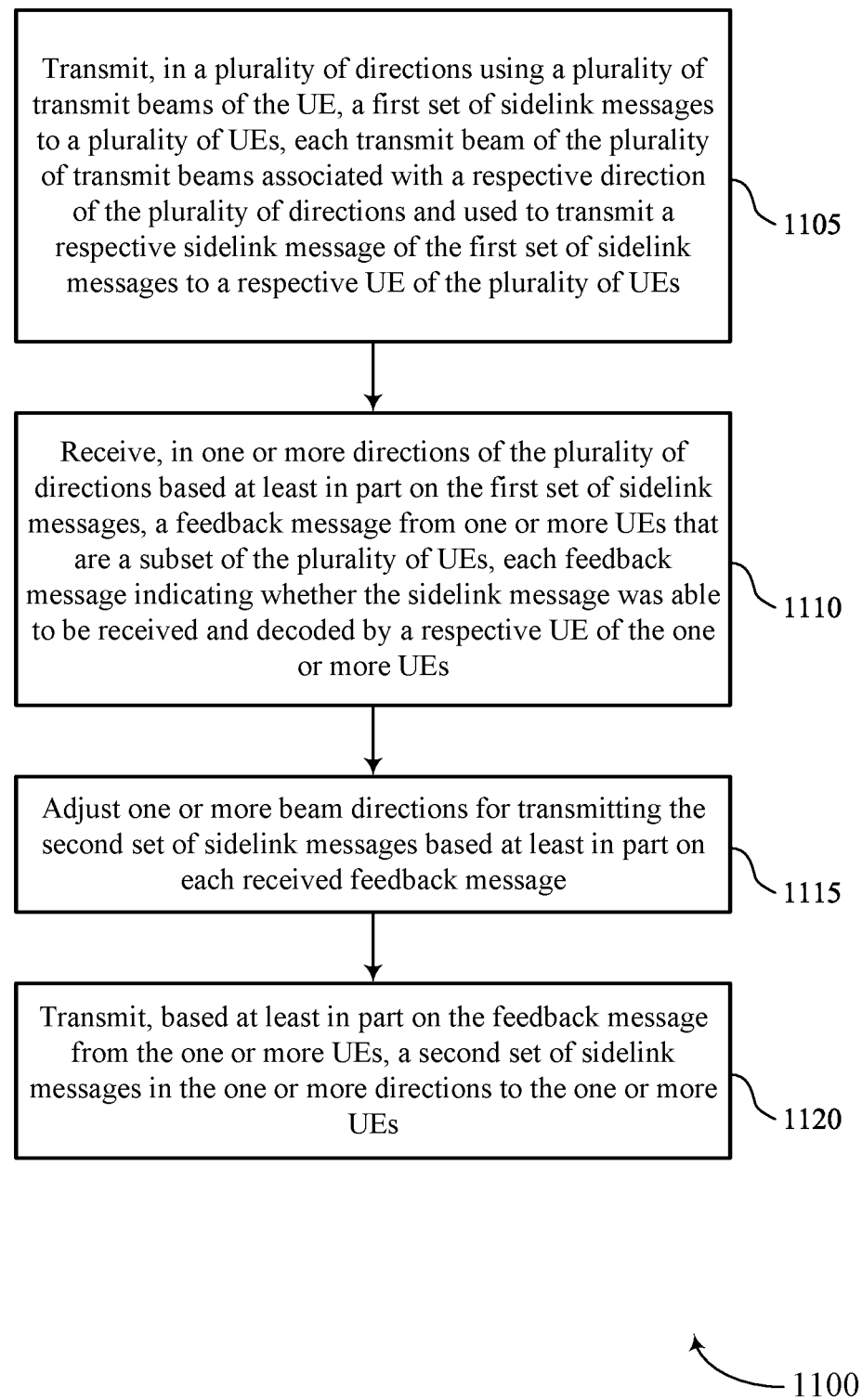

FIG. 11 shows a flowchart illustrating a method 1100 that supports on demand sidelink retransmission for higher bands in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The operations of 1105 may be performed in accordance with examples as disclosed herein. In some examples, aspects of the operations of 1105 may be performed by a sidelink message manager 825 as described with reference to FIG. 8.

At 1110, the method may include receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The operations of 1110 may be performed in accordance with examples as disclosed herein. In some examples, aspects of the operations of 1110 may be performed by a feedback manager 830 as described with reference to FIG. 8.

At 1115, the method may include adjusting one or more beam directions for transmitting the second set of sidelink messages based on each received feedback message. The operations of 1115 may be performed in accordance with examples as disclosed herein. In some examples, aspects of the operations of 1115 may be performed by a beam adjustment manager 835 as described with reference to FIG. 8.

At 1120, the method may include transmitting, based on the feedback message from the one or more UEs, a second set of sidelink messages in the one or more directions to the one or more UEs. The operations of 1120 may be performed in accordance with examples as disclosed herein. In some examples, aspects of the operations of 1120 may be performed by a sidelink message manager 825 as described with reference to FIG. 8.

Figure 12:
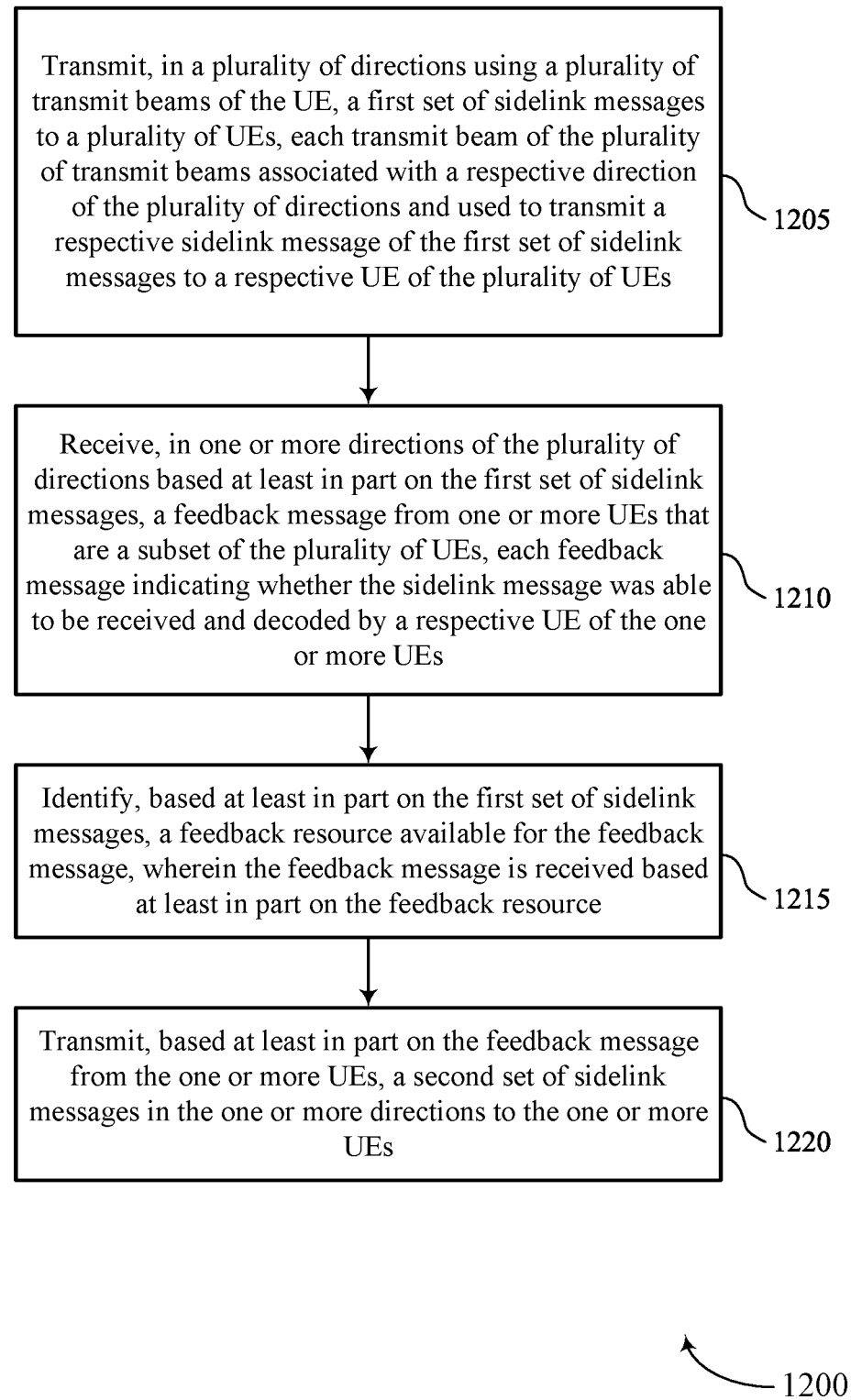

FIG. 12 shows a flowchart illustrating a method 1200 that supports on demand sidelink retransmission for higher bands in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include transmitting, in a set of multiple directions using a set of multiple transmit beams of the UE, a first set of sidelink messages to a set of multiple UEs, each transmit beam of the set of multiple transmit beams associated with a respective direction of the set of multiple directions and used to transmit a respective sidelink message of the first set of sidelink messages to a respective UE of the set of multiple UEs. The operations of 1205 may be performed in accordance with examples as disclosed herein. In some examples, aspects of the operations of 1205 may be performed by a sidelink message manager 825 as described with reference to FIG. 8.

At 1210, the method may include receiving, in one or more directions of the set of multiple directions based on the first set of sidelink messages, a feedback message from one or more UEs that are a subset of the set of multiple UEs, each feedback message indicating whether the sidelink message was able to be received and decoded by a respective UE of the one or more UEs. The operations of 1210 may be performed in accordance with examples as disclosed herein. In some examples, aspects of the operations of 1210 may be performed by a feedback manager 830 as described with reference to FIG. 8.

At 1215, the method may include identifying, based on the first set of sidelink messages, a feedback resource available for the feedback message, where the feedback message is received based on the feedback resource. The operations of 1215 may be performed in accordance with examples as disclosed herein. In some examples, aspects of the operations of 1215 may be performed by a feedback resource manager 840 as described with reference to FIG. 8.

At 1220, the method may include transmitting, based on the feedback message from the one or more UEs, a second set of sidelink messages in the one or more directions to the one or more UEs. The operations of 1220 may be performed in accordance with examples as disclosed herein. In some examples, aspects of the operations of 1220 may be performed by a sidelink message manager 825 as described with reference to FIG. 8.

The following provides an overview of aspects of the present disclosure:

Aspect 1: A method for wireless communication at a UE, comprising: transmitting, in a plurality of directions using a plurality of transmit beams of the UE, a first set of sidelink messages to a plurality of UEs, each transmit beam of the plurality of transmit beams associated with a respective direction of the plurality of directions and used to transmit a respective sidelink message of the first set of sidelink messages to a respective UE of the plurality of UEs; receiving, in one or more directions of the plurality of directions based at least in part on the first set of sidelink messages, a feedback message from one or more UEs that are a subset of the plurality of UEs, each feedback message indicating whether the sidelink message was able to be received and decoded by a respective UE of the one or more UEs; and transmitting, based at least in part on the feedback message from the one or more UEs, a second set of sidelink messages in the one or more directions to the one or more UEs.

Aspect 2: The method of aspect 1, further comprising: adjusting one or more beam directions for transmitting the second set of sidelink messages based at least in part on each received feedback message.

Aspect 3: The method of any of aspects 1 through 2, further comprising: identifying, based at least in part on the first set of sidelink messages, a feedback resource available for the feedback message, wherein the feedback message is received based at least in part on the feedback resource.

Aspect 4: The method of any of aspects 1 through 3, wherein the first set of sidelink messages comprises a plurality of sidelink control messages and the second set of sidelink messages comprises one or more sidelink data messages.

Aspect 5: The method of aspect 4, further comprising: identifying a repetition count for the plurality of sidelink control messages, wherein the plurality of sidelink control messages are transmitted according to the repetition count.

Aspect 6: The method of any of aspects 4 through 5, further comprising: identifying a resource count for the plurality of sidelink control messages, wherein the plurality of sidelink control messages are transmitted according to the resource count.

Aspect 7: The method of any of aspects 4 through 6, wherein the plurality of sidelink control messages identify the one or more sidelink data messages.

Aspect 8: The method of any of aspects 1 through 7, wherein the first set of sidelink messages comprises sidelink channel messages and the second set of sidelink messages comprises a subset of the first set of sidelink messages.

Aspect 9: The method of aspect 8, further comprising: determining that the feedback message from the one or more UEs indicates that the one or more UEs were unable to successfully receive and decode the sidelink channel messages; and identifying the one or more UEs based at least in part on the feedback message indicating the one or more UEs were unable to successfully receive and decode the sidelink channel messages, wherein transmitting the second set of sidelink messages in the one or more directions to the one or more UEs is based at least in part on identifying the one or more UEs.

Aspect 10: The method of any of aspects 8 through 9, wherein the sidelink channel messages comprise one or more sidelink control messages, one or more sidelink data messages, or both.

Aspect 11: An apparatus for wireless communication at a UE, comprising a processor; memory coupled with the processor; and instructions stored in the memory and executable by the processor to cause the apparatus to perform a method of any of aspects 1 through 10.

Aspect 12: An apparatus for wireless communication at a UE, comprising at least one means for performing a method of any of aspects 1 through 10.

Aspect 13: A non-transitory computer-readable medium storing code for wireless communication at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processing system that includes one or more processors and one or more memories coupled with the one or more processors, the processing system configured to cause the apparatus to:
        transmit, in a plurality of directions using a plurality of transmit beams of the UE, a first set of sidelink messages to a plurality of UEs in a broadcast or groupcast sidelink transmission, each transmit beam of the plurality of transmit beams associated with a respective direction of the plurality of directions and used to transmit a respective sidelink message of the first set of sidelink messages to a respective UE of the plurality of UEs;
        receive, via one or more feedback resources in one or more directions of the plurality of directions in accordance with the first set of sidelink messages, one or more feedback messages from one or more first UEs that are a first subset of the plurality of UEs, each feedback message of the one or more feedback messages indicating either an acknowledgement or a negative-acknowledgement that indicates whether the respective UE is requesting to receive a second set of sidelink messages, each direction of the plurality of directions being associated with a respective feedback resource of the one or more feedback resources and a respective transmit beam of the plurality of transmit beams, and each feedback resource of the one or more feedback resources comprising a code resource;
        adjust one or more parameters of one or more transmit beams of the plurality of transmit beams based on the one or more transmit beams and the one or more feedback messages;
        transmit, in accordance with the one or more feedback messages from the one or more first UEs and via the one or more feedback resources, the second set of sidelink messages in one or more adjusted directions to the one or more first UEs based on adjusting the one or more parameters of the one or more transmit beams and in accordance with a count of the one or more feedback resources;
        receive, via a subset of the one or more feedback resources in the one or more adjusted directions of the plurality of directions, one or more second feedback messages from one or more second UEs that are a second subset of the first subset of the plurality of UEs, each second feedback message of the one or more feedback messages indicating either an acknowledgement or a negative- acknowledgement that indicates whether the respective UE is requesting to receive a third set of sidelink messages, each direction of the one or more adjusted directions being associated with a respective feedback resource of the subset of feedback resources and a respective transmit beam of a subset of the plurality of transmit beams;
        adjust one or more parameters of one or more second transmit beams of the subset of the plurality of transmit beams based on the one or more second transmit beams and the one or more second feedback messages; and
        transmit, in accordance with the one or more second feedback messages from the one or more second UEs and via the subset of the one or more feedback resources, the third set of sidelink messages in the one or more adjusted directions to the one or more second UEs based on adjusting the one or more parameters of the one or more transmit beams and in accordance with a count of the subset of the one or more feedback resources, the count of the subset of the one or more feedback resources less than the count of the one or more feedback resources.

2. The apparatus of claim 1, wherein the processing system is further configured to cause the apparatus to:
identify, in accordance with the first set of sidelink messages, a feedback resource available for the one or more feedback messages, wherein the one or more feedback messages are received in accordance with the feedback resource.

3. The apparatus of claim 1, wherein the first set of sidelink messages comprises a plurality of sidelink control messages and the second set of sidelink messages comprises one or more sidelink data messages.

4. The apparatus of claim 3, wherein the processing system is further configured to cause the apparatus to:
identify a repetition count for the plurality of sidelink control messages, wherein the plurality of sidelink control messages are transmitted according to the repetition count.

5. The apparatus of claim 3, wherein the processing system is further configured to cause the apparatus to:
identify a resource count for the plurality of sidelink control messages, wherein the plurality of sidelink control messages are transmitted according to the resource count.

6. The apparatus of claim 3, wherein the plurality of sidelink control messages identify the one or more sidelink data messages.

7. The apparatus of claim 1, wherein the first set of sidelink messages comprises sidelink channel messages and the second set of sidelink messages comprises a subset of the first set of sidelink messages.

8. The apparatus of claim 7, wherein the processing system is further configured to cause the apparatus to:
identify the one or more first UEs in accordance with the one or more feedback messages from the one or more first UEs, wherein transmitting the second set of sidelink messages in the one or more directions to the one or more first UEs is in accordance with identifying the one or more first UEs.

9. The apparatus of claim 7, wherein the sidelink channel messages comprise one or more sidelink control messages, one or more sidelink data messages, or both.

10. A method for wireless communication at a user equipment (UE), comprising:
transmitting, in a plurality of directions using a plurality of transmit beams of the UE, a first set of sidelink messages to a plurality of UEs in a broadcast or groupcast sidelink transmission, each transmit beam of the plurality of transmit beams associated with a respective direction of the plurality of directions and used to transmit a respective sidelink message of the first set of sidelink messages to a respective UE of the plurality of UEs;
receiving, via one or more feedback resources in one or more directions of the plurality of directions in accordance with the first set of sidelink messages, one or more feedback messages from one or more first UEs that are a first subset of the plurality of UEs, each feedback message of the one or more feedback messages indicating either an acknowledgement or a negative-acknowledgement that indicates whether the respective UE is requesting to receive a second set of sidelink messages, each direction of the plurality of directions being associated with a respective feedback resource of the one or more feedback resources and a respective transmit beam of the plurality of transmit beams, and each feedback resource of the one or more feedback resources comprising a code resource;

adjusting one or more parameters of one or more transmit beams of the plurality of transmit beams based on the one or more transmit beams and the one or more feedback messages;

transmitting, in accordance with the one or more feedback messages from the one or more first UEs and via the one or more feedback resources, the second set of sidelink messages in one or more adjusted directions to the one or more first UEs based on adjusting the one or more parameters of the one or more transmit beams and in accordance with a count of the one or more feedback resources;

receiving, via a subset of the one or more feedback resources in the one or more adjusted directions of the plurality of directions, one or more second feedback messages from one or more second UEs that are a second subset of the first subset of the plurality of UEs, each second feedback message of the one or more feedback messages indicating either an acknowledgement or a negative-acknowledgement that indicates whether the respective UE is requesting to receive a third set of sidelink messages, each direction of the one or more adjusted directions being associated with a respective feedback resource of the subset of feedback resources and a respective transmit beam of a subset of the plurality of transmit beams;

adjusting one or more parameters of one or more second transmit beams of the subset of the plurality of transmit beams based on the one or more second transmit beams and the one or more second feedback messages; and transmitting, in accordance with the one or more second feedback messages from the one or more second UEs and via the subset of the one or more feedback resources, the third set of sidelink messages in the one or more adjusted directions to the one or more second UEs based on adjusting the one or more parameters of the one or more transmit beams and in accordance with a count of the subset of the one or more feedback resources, the count of the subset of the one or more feedback resources less than the count of the one or more feedback resources.

11. The method of claim 10, further comprising:
identifying, in accordance with the first set of sidelink messages, a feedback resource available for the one or more feedback messages, wherein the one or more feedback messages are received in accordance with the feedback resource.

12. The method of claim 10, wherein the first set of sidelink messages comprises a plurality of sidelink control messages and the second set of sidelink messages comprises one or more sidelink data messages.

13. The method of claim 12, further comprising:
identifying a repetition count for the plurality of sidelink control messages, wherein the plurality of sidelink control messages are transmitted according to the repetition count.

14. The method of claim 12, further comprising:
identifying a resource count for the plurality of sidelink control messages, wherein the plurality of sidelink control messages are transmitted according to the resource count.

15. The method of claim 12, wherein the plurality of sidelink control messages identify the one or more sidelink data messages.

16. The method of claim 10, wherein the first set of sidelink messages comprises sidelink channel messages and the second set of sidelink messages comprises a subset of the first set of sidelink messages.

17. The method of claim 16, further comprising:
identifying the one or more first UEs in accordance with the one or more feedback messages from the one or more first UEs, wherein transmitting the second set of sidelink messages in the one or more directions to the one or more first UEs is in accordance with identifying the one or more first UEs.

18. The method of claim 16, wherein the sidelink channel messages comprise one or more sidelink control messages, one or more sidelink data messages, or both.

19. A user equipment (UE) for wireless communication, comprising:
means for transmitting, in a plurality of directions using a plurality of transmit beams of the UE, a first set of sidelink messages to a plurality of UEs in a broadcast or groupcast sidelink transmission, each transmit beam of the plurality of transmit beams associated with a respective direction of the plurality of directions and used to transmit a respective sidelink message of the first set of sidelink messages to a respective UE of the plurality of UEs;
means for receiving, via one or more feedback resources in one or more directions of the plurality of directions in accordance with the first set of sidelink messages, one or more feedback messages from one or more first UEs that are a first subset of the plurality of UEs, each feedback message of the one or more feedback messages indicating either an acknowledgement or a negative-acknowledgement that indicates whether the respective UE is requesting to receive a second set of sidelink messages, each direction of the plurality of directions being associated with a respective feedback resource of the one or more feedback resources and a respective transmit beam of the plurality of transmit beams, and each feedback resource of the one or more feedback resources comprising a code resource;
means for adjusting one or more parameters of one or more transmit beams of the plurality of transmit beams based on the one or more transmit beams and the one or more feedback messages;
means for transmitting, in accordance with the one or more feedback messages from the one or more first UEs and via the one or more feedback resources, the second set of sidelink messages in one or more adjusted directions to the one or more first UEs based on adjusting the one or more parameters of the one or more transmit beams and in accordance with a count of the one or more feedback resources;
means for receiving, via a subset of the one or more feedback resources in the one or more adjusted directions of the plurality of directions, one or more second feedback messages from one or more second UEs that are a second subset of the first subset of the plurality of UEs, each second feedback message of the one or more feedback messages indicating either an acknowledgement or a negative-acknowledgement that indicates whether the respective UE is requesting to receive a third set of sidelink messages, each direction of the one or more adjusted directions being associated with a respective feedback resource of the subset of feedback resources and a respective transmit beam of a subset of the plurality of transmit beams;
means for adjusting one or more parameters of one or more second transmit beams of the subset of the plurality of transmit beams based on the one or more second transmit beams and the one or more second feedback messages; and
means for transmitting, in accordance with the one or more second feedback messages from the one or more second UEs and via the subset of the one or more feedback resources, the third set of sidelink messages in the one or more adjusted directions to the one or more second UEs based on adjusting the one or more parameters of the one or more transmit beams and in accordance with a count of the subset of the one or more feedback resources, the count of the subset of the one or more feedback resources less than the count of the one or more feedback resources.

20. The UE of claim 19, further comprising:
means for identifying, in accordance with the first set of sidelink messages, a feedback resource available for the one or more feedback messages, wherein the one or more feedback messages are received in accordance with the feedback resource.

21. The UE of claim 19, wherein the first set of sidelink messages comprises a plurality of sidelink control messages and the second set of sidelink messages comprises one or more sidelink data messages.

22. The UE of claim 21, further comprising:
means for identifying a repetition count for the plurality of sidelink control messages, wherein the plurality of sidelink control messages are transmitted according to the repetition count.

23. The UE of claim 21, further comprising:
means for identifying a resource count for the plurality of sidelink control messages, wherein the plurality of sidelink control messages are transmitted according to the resource count.

24. The UE of claim 21, wherein the plurality of sidelink control messages identify the one or more sidelink data messages.

25. The UE of claim 19, wherein the first set of sidelink messages comprises sidelink channel messages and the second set of sidelink messages comprises a subset of the first set of sidelink messages.

26. The UE of claim 25, further comprising:
means for identifying the one or more first UEs in accordance with the one or more feedback messages from the one or more first UEs, wherein transmitting the second set of sidelink messages in the one or more directions to the one or more first UEs is in accordance with identifying the one or more first UEs.

27. A non-transitory computer-readable medium storing code for wireless communication at a user equipment (UE), the code comprising instructions executable by one or more processors to:
transmit, in a plurality of directions using a plurality of transmit beams of the UE, a first set of sidelink messages to a plurality of UEs in a broadcast or groupcast sidelink transmission, each transmit beam of the plurality of transmit beams associated with a respective direction of the plurality of directions and used to transmit a respective sidelink message of the first set of sidelink messages to a respective UE of the plurality of UEs;

receive, via one or more feedback resources in one or more directions of the plurality of directions in accordance with the first set of sidelink messages, one or more feedback messages from one or more first UEs that are a first subset of the plurality of UEs, each feedback message of the one or more feedback messages indicating either an acknowledgement or a negative-acknowledgement that indicates whether the respective UE is requesting to receive a second set of sidelink messages, each direction of the plurality of directions being associated with a respective feedback resource of the one or more feedback resources and a respective transmit beam of the plurality of transmit beams, and each feedback resource of the one or more feedback resources comprising a code resource;

adjust one or more parameters of one or more transmit beams of the plurality of transmit beams based on the one or more transmit beams and the one or more feedback messages;

transmit, in accordance with the one or more feedback messages from the one or more first UEs and via the one or more feedback resources, the second set of sidelink messages in one or more adjusted directions to the one or more first UEs based on adjusting the one or more parameters of the one or more transmit beams and in accordance with a count of the one or more feedback resources;

receive, via a subset of the one or more feedback resources in the one or more adjusted directions of the plurality of directions, one or more second feedback messages from one or more second UEs that are a second subset of the first subset of the plurality of UEs, each second feedback message of the one or more feedback messages indicating either an acknowledgement or a negative-acknowledgement that indicates whether the respective UE is requesting to receive a third set of sidelink messages, each direction of the one or more adjusted directions being associated with a respective feedback resource of the subset of feedback resources and a respective transmit beam of a subset of the plurality of transmit beams;

adjust one or more parameters of one or more second transmit beams of the subset of the plurality of transmit beams based on the one or more second transmit beams and the one or more second feedback messages; and transmit, in accordance with the one or more second feedback messages from the one or more second UEs and via the subset of the one or more feedback resources, the third set of sidelink messages in the one or more adjusted directions to the one or more second UEs based on readjusting the one or more parameters of the one or more transmit beams and in accordance with a count of the subset of the one or more feedback resources, the count of the subset of the one or more feedback resources less than the count of the one or more feedback resources.

* * * * *